(12) United States Patent
Schwarz, Jr.

(10) Patent No.: US 8,020,754 B2
(45) Date of Patent: Sep. 20, 2011

(54) SYSTEM AND METHOD FOR FUNDING A COLLECTIVE ACCOUNT BY USE OF AN ELECTRONIC TAG

(75) Inventor: Charles E. Schwarz, Jr., Wilmington, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 497 days.

(21) Appl. No.: 11/881,304

(22) Filed: Jul. 26, 2007

(65) Prior Publication Data

US 2008/0010202 A1    Jan. 10, 2008

Related U.S. Application Data

(63) Continuation of application No. 11/397,544, filed on Apr. 4, 2006, now Pat. No. 7,311,244, which is a continuation of application No. 10/937,655, filed on Sep. 9, 2004, now Pat. No. 7,051,925, which is a continuation of application No. 09/927,462, filed on Aug. 13, 2001, now Pat. No. 6,945,453.

(51) Int. Cl.
    *G06F 17/00* (2006.01)

(52) U.S. Cl. ............ 235/375; 235/380; 235/382; 705/1; 705/14

(58) Field of Classification Search ............... 235/375, 235/380, 382, 492; 705/1, 35, 39, 41
    See application file for complete search history.

(56) References Cited

U.S. PATENT DOCUMENTS

| | | | |
|---|---|---|---|
| 3,230,650 A | 1/1966 | Orkin | |
| 3,287,839 A | 11/1966 | Rotwein et al. | |
| 3,634,669 A | 1/1972 | Soumas et al. | |
| 3,713,235 A | 1/1973 | Roberts | |
| 3,855,033 A | 12/1974 | Staats | |
| 3,938,090 A | 2/1976 | Borison et al. | |
| 3,946,206 A | 3/1976 | Darjany | |
| 4,022,943 A | 5/1977 | Erb et al. | |
| 4,047,033 A | 9/1977 | Malmberg et al. | |
| 4,058,220 A | 11/1977 | Torongo | |
| D248,203 S | 6/1978 | Morse | |
| 4,123,747 A | 10/1978 | Lancto et al. | |
| 4,130,881 A | 12/1978 | Haessler et al. | |
| 4,205,780 A | 6/1980 | Burns et al. | |
| 4,223,403 A | 9/1980 | Konheim et al. | |

(Continued)

FOREIGN PATENT DOCUMENTS

CA    2293321    12/1998

(Continued)

OTHER PUBLICATIONS

ViVOtech, Inc., "RF-Based Contactess Payment: A More Convenient Way to Pay", ViVOtech, Inc., Version 2.0, Apr. 2004, pp. 4-25.*

(Continued)

*Primary Examiner* — Edwyn Labaze

(74) *Attorney, Agent, or Firm* — Hunton & Williams, LLP

(57) ABSTRACT

A system and method for funding a collective account via aggregating usage of electronic tags is disclosed. The system and method promotes the use of electronic tags, and the funding of collective accounts that may be associated with charitable or other philanthropic causes. Further benefits may be realized by replenishing the prefunded account that serves as the source of funds for the electronic tag to an affinity account that also benefits the charitable or other philanthropic cause.

20 Claims, 4 Drawing Sheets

U.S. PATENT DOCUMENTS

| | | |
|---|---|---|
| D259,048 S | 4/1981 | Peterson |
| 4,264,808 A | 4/1981 | Owens et al. |
| 4,319,336 A | 3/1982 | Andersen et al. |
| 4,321,672 A | 3/1982 | Braun et al. |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,465,206 A | 8/1984 | Sorel et al. |
| 4,479,995 A | 10/1984 | Suzuki et al. |
| 4,545,838 A | 10/1985 | Minkus et al. |
| 4,575,127 A | 3/1986 | Michel |
| 4,575,621 A | 3/1986 | Dreifus |
| 4,579,754 A | 4/1986 | Maurer et al. |
| 4,582,985 A | 4/1986 | Lofberg |
| 4,605,820 A | 8/1986 | Campbell, Jr. |
| 4,605,844 A | 8/1986 | Haggan |
| 4,614,861 A | 9/1986 | Pavlov et al. |
| 4,634,845 A | 1/1987 | Riley et al. |
| 4,641,239 A | 2/1987 | Takesako |
| 4,643,452 A | 2/1987 | Chang |
| 4,645,701 A | 2/1987 | Zarrow |
| 4,647,714 A | 3/1987 | Goto |
| 4,648,189 A | 3/1987 | Michel |
| 4,650,981 A | 3/1987 | Foletta |
| 4,661,658 A | 4/1987 | Matyas |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,711,996 A | 12/1987 | Drexler |
| 4,713,760 A | 12/1987 | Yamada et al. |
| 4,723,212 A | 2/1988 | O'Brien |
| 4,736,094 A | 4/1988 | Yoshida |
| 4,746,787 A | 5/1988 | Okada et al. |
| 4,747,620 A | 5/1988 | Kay et al. |
| 4,750,119 A | 6/1988 | Robertson et al. |
| 4,752,676 A | 6/1988 | Leonard et al. |
| 4,754,418 A | 6/1988 | Hara |
| 4,755,661 A | 7/1988 | Ruebsam |
| 4,766,293 A | 8/1988 | Boston |
| 4,766,539 A | 8/1988 | Fox |
| 4,777,563 A | 10/1988 | Teraoka et al. |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,839,504 A | 6/1989 | Nakano |
| 4,845,347 A | 7/1989 | McCrindle |
| 4,851,650 A | 7/1989 | Kitade |
| 4,854,590 A | 8/1989 | Jolliff et al. |
| 4,856,857 A | 8/1989 | Takeuchi et al. |
| 4,859,837 A | 8/1989 | Halpern |
| 4,866,545 A | 9/1989 | LaManna et al. |
| 4,868,376 A | 9/1989 | Lessin et al. |
| 4,870,259 A | 9/1989 | Boggan et al. |
| 4,877,947 A | 10/1989 | Mori |
| 4,882,675 A | 11/1989 | Nichtberger et al. |
| 4,891,503 A | 1/1990 | Jewell |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,931,623 A | 6/1990 | Nakamura et al. |
| 4,938,830 A | 7/1990 | Cannistra |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| D310,386 S | 9/1990 | Michels et al. |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,986,868 A | 1/1991 | Schmidt |
| 4,992,940 A | 2/1991 | Dworkin |
| 5,023,782 A | 6/1991 | Lutz et al. |
| 5,025,139 A | 6/1991 | Halliburton, Jr. |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasegawa |
| 5,056,019 A | 10/1991 | Schultz et al. |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,122,950 A | 6/1992 | Mee et al. |
| 5,140,517 A | 8/1992 | Nagata et al. |
| 5,146,068 A | 9/1992 | Ugawa et al. |
| 5,163,098 A | 11/1992 | Dahbura |
| 5,173,851 A | 12/1992 | Off et al. |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel et al. |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,231,569 A | 7/1993 | Myatt et al. |
| 5,237,620 A | 8/1993 | Deaton |
| 5,239,462 A | 8/1993 | Jones |
| 5,247,190 A | 9/1993 | Friend et al. |
| 5,257,486 A | 11/1993 | Holmwall |
| 5,265,008 A | 11/1993 | Benton et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,326,960 A | 7/1994 | Tannenbaum |
| 5,327,508 A | 7/1994 | Deaton et al. |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,380,046 A | 1/1995 | Stephens |
| 5,382,784 A | 1/1995 | Eberhardt |
| 5,383,113 A | 1/1995 | Knight |
| 5,383,687 A | 1/1995 | Suess et al. |
| 5,388,165 A | 2/1995 | Gabriel et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,412,190 A | 5/1995 | Kopesec et al. |
| 5,412,192 A | 5/1995 | Hoss |
| 5,413,341 A | 5/1995 | Lieberman |
| 5,424,524 A | 6/1995 | Ruppert et al. |
| 5,428,684 A | 6/1995 | Akiyama et al. |

| | | | | | | |
|---|---|---|---|---|---|---|
| 5,430,644 A | 7/1995 | Deaton et al. | | 5,675,607 A | 10/1997 | Alesio et al. |
| 5,432,326 A | 7/1995 | Noblett et al. | | 5,675,662 A | 10/1997 | Deaton et al. |
| 5,440,108 A | 8/1995 | Tran et al. | | 5,677,521 A | 10/1997 | Garrou |
| 5,444,794 A | 8/1995 | Uhland | | 5,677,955 A | 10/1997 | Doggett et al. |
| 5,448,471 A | 9/1995 | Deaton et al. | | 5,680,459 A | 10/1997 | Hook et al. |
| 5,450,477 A | 9/1995 | Amarant et al. | | 5,684,291 A | 11/1997 | Taskett |
| 5,450,491 A | 9/1995 | McNair | | 5,687,322 A | 11/1997 | Deaton et al. |
| 5,453,601 A | 9/1995 | Rosen | | 5,689,100 A | 11/1997 | Carrithers et al. |
| 5,455,407 A | 10/1995 | Rosen | | 5,689,650 A | 11/1997 | McClelland et al. |
| 5,457,305 A | 10/1995 | Akel et al. | | 5,692,132 A | 11/1997 | Hogan |
| 5,459,306 A | 10/1995 | Stein et al. | | 5,696,907 A | 12/1997 | Tom |
| 5,465,206 A | 11/1995 | Hilt et al. | | 5,698,837 A | 12/1997 | Furuta |
| 5,466,919 A | 11/1995 | Hovakimian | | 5,699,528 A | 12/1997 | Hogan |
| 5,466,920 A | 11/1995 | Nair et al. | | 5,700,037 A | 12/1997 | Keller |
| 5,471,669 A | 11/1995 | Lidman | | 5,703,344 A | 12/1997 | Bezy et al. |
| 5,477,038 A | 12/1995 | Levine et al. | | 5,704,044 A | 12/1997 | Tarter et al. |
| 5,477,040 A | 12/1995 | Lalonde | | 5,704,046 A | 12/1997 | Hogan |
| 5,479,494 A | 12/1995 | Clitherow | | 5,705,798 A | 1/1998 | Tarbox |
| 5,481,094 A | 1/1996 | Suda | | 5,708,422 A | 1/1998 | Blonder et al. |
| 5,482,139 A | 1/1996 | Rivalto | | 5,710,458 A | 1/1998 | Iwasaki |
| 5,483,444 A | 1/1996 | Malark et al. | | 5,710,886 A | 1/1998 | Christensen et al. |
| 5,483,445 A | 1/1996 | Pickering | | 5,710,887 A | 1/1998 | Chelliah |
| 5,489,123 A | 2/1996 | Roshkoff | | 5,710,889 A | 1/1998 | Clark et al. |
| 5,495,981 A | 3/1996 | Warther | | 5,715,298 A | 2/1998 | Rogers |
| 5,500,514 A | 3/1996 | Veeneman et al. | | 5,715,399 A | 2/1998 | Bezos |
| 5,500,890 A | 3/1996 | Rogge et al. | | 5,717,925 A | 2/1998 | Harper et al. |
| 5,503,891 A | 4/1996 | Marshall et al. | | 5,721,768 A | 2/1998 | Stimson et al. |
| 5,511,114 A | 4/1996 | Stimson et al. | | 5,721,781 A | 2/1998 | Deo et al. |
| 5,512,654 A | 4/1996 | Holmes et al. | | 5,726,884 A | 3/1998 | Sturgeon et al. |
| 5,513,102 A | 4/1996 | Auriemma | | 5,727,153 A | 3/1998 | Powell |
| 5,521,363 A | 5/1996 | Tannenbaum | | 5,728,998 A | 3/1998 | Novis et al. |
| 5,530,232 A | 6/1996 | Taylor | | 5,729,693 A | 3/1998 | Holda-Fleck |
| 5,530,235 A | 6/1996 | Stefik et al. | | 5,732,136 A | 3/1998 | Murphree et al. |
| 5,532,689 A | 7/1996 | Bueno | | 5,734,154 A | 3/1998 | Jachimowicz et al. |
| 5,537,314 A | 7/1996 | Kanter | | 5,734,838 A | 3/1998 | Robinson |
| 5,539,825 A | 7/1996 | Akiyama et al. | | 5,736,728 A | 4/1998 | Matsubara |
| 5,541,583 A | 7/1996 | Mandelbaum | | 5,737,421 A | 4/1998 | Audebert |
| 5,544,086 A | 8/1996 | Davis et al. | | 5,740,549 A | 4/1998 | Reilly et al. |
| 5,544,246 A | 8/1996 | Mandelbaum et al. | | 5,742,775 A | 4/1998 | King |
| 5,546,446 A | 8/1996 | Tsunokawa et al. | | 5,744,787 A | 4/1998 | Teicher |
| 5,553,120 A | 9/1996 | Katz | | 5,745,049 A | 4/1998 | Akiyama et al. |
| 5,557,092 A | 9/1996 | Ackley et al. | | 5,745,555 A | 4/1998 | Mark |
| 5,557,516 A | 9/1996 | Hogan | | 5,745,706 A | 4/1998 | Wolfberg et al. |
| 5,563,934 A | 10/1996 | Eda | | 5,748,737 A | 5/1998 | Daggar |
| 5,572,004 A | 11/1996 | Raimann | | 5,749,075 A | 5/1998 | Toader et al. |
| 5,577,109 A | 11/1996 | Stimson et al. | | 5,760,381 A | 6/1998 | Stich et al. |
| 5,578,808 A | 11/1996 | Taylor | | 5,765,138 A | 6/1998 | Aycock et al. |
| 5,581,064 A | 12/1996 | Riley et al. | | 5,765,141 A | 6/1998 | Spector |
| 5,583,933 A | 12/1996 | Mark | | 5,770,843 A | 6/1998 | Rose et al. |
| 5,585,787 A | 12/1996 | Wallerstein | | 5,770,849 A | 6/1998 | Novis et al. |
| 5,590,038 A | 12/1996 | Pitroda | | 5,774,870 A | 6/1998 | Storey |
| 5,592,560 A | 1/1997 | Deaton et al. | | 5,774,882 A | 6/1998 | Keen |
| 5,604,542 A | 2/1997 | Dedrick | | 5,777,305 A | 7/1998 | Smith et al. |
| 5,608,785 A | 3/1997 | Kasday | | 5,777,306 A | 7/1998 | Masuda |
| 5,609,253 A | 3/1997 | Goade, Sr. | | 5,777,903 A | 7/1998 | Piosenka et al. |
| 5,612,868 A | 3/1997 | Off | | 5,778,067 A | 7/1998 | Jones et al. |
| 5,617,474 A | 4/1997 | Ditzig et al. | | 5,787,156 A | 7/1998 | Katz |
| 5,619,558 A | 4/1997 | Jheeta | | 5,787,403 A | 7/1998 | Randle |
| 5,621,787 A | 4/1997 | McKoy et al. | | 5,787,404 A | 7/1998 | Fernandez-Holman |
| 5,621,812 A | 4/1997 | Deaton et al. | | 5,789,732 A | 8/1998 | McMahon et al. |
| 5,623,547 A | 4/1997 | Jones et al. | | 5,789,733 A | 8/1998 | Jachimowicz et al. |
| 5,637,845 A | 6/1997 | Kolls | | 5,790,636 A | 8/1998 | Marshall |
| 5,638,457 A | 6/1997 | Deaton et al. | | 5,794,207 A | 8/1998 | Walker |
| 5,642,279 A | 6/1997 | Stone et al. | | 5,796,827 A | 8/1998 | Coppersmith et al. |
| 5,642,485 A | 6/1997 | Deaton et al. | | 5,797,133 A | 8/1998 | Jones |
| 5,644,723 A | 7/1997 | Deaton et al. | | 5,798,950 A | 8/1998 | Fitzgerald |
| 5,644,727 A | 7/1997 | Atkins | | 5,799,087 A | 8/1998 | Rosen |
| 5,649,114 A | 7/1997 | Deaton et al. | | 5,802,176 A | 9/1998 | Audebert |
| 5,649,117 A | 7/1997 | Landry | | 5,805,719 A | 9/1998 | Pare et al. |
| 5,649,118 A | 7/1997 | Carlisle et al. | | 5,806,042 A | 9/1998 | Kelly et al. |
| 5,650,604 A | 7/1997 | Marcous et al. | | 5,806,044 A | 9/1998 | Powell |
| 5,652,786 A | 7/1997 | Rogers | | 5,806,045 A | 9/1998 | Biorge |
| 5,653,914 A | 8/1997 | Holmes et al. | | 5,806,047 A | 9/1998 | Hackel et al. |
| 5,659,469 A | 8/1997 | Deaton et al. | | 5,807,627 A | 9/1998 | Friend et al. |
| 5,659,741 A | 8/1997 | Eberhardt | | 5,809,478 A | 9/1998 | Greco |
| 5,664,110 A | 9/1997 | Green et al. | | 5,814,796 A | 9/1998 | Benson et al. |
| 5,664,157 A | 9/1997 | Takahira et al. | | 5,815,657 A | 9/1998 | Williams et al. |
| 5,665,953 A | 9/1997 | Mazzamuto | | 5,815,658 A | 9/1998 | Kuriyama |
| 5,672,678 A | 9/1997 | Holmes et al. | | 5,819,234 A | 10/1998 | Slavin et al. |

| | | | | | | |
|---|---|---|---|---|---|---|
| 5,819,237 | A | 10/1998 | Garman | 5,970,480 | A | 10/1999 | Kalina |
| 5,825,871 | A | 10/1998 | Mark | 5,974,399 | A | 10/1999 | Giuliani et al. |
| 5,826,243 | A | 10/1998 | Musmanno et al. | RE36,365 | E | 11/1999 | Levine et al. |
| 5,832,090 | A | 11/1998 | Raspotnik | 5,979,757 | A | 11/1999 | Tracy |
| 5,832,457 | A | 11/1998 | O'Brien | 5,984,180 | A | 11/1999 | Albrecht |
| 5,832,488 | A | 11/1998 | Eberhardt | 5,984,191 | A | 11/1999 | Chapin, Jr. |
| 5,835,061 | A | 11/1998 | Stewart | 5,987,434 | A | 11/1999 | Libman |
| 5,835,576 | A | 11/1998 | Katz | 5,988,509 | A | 11/1999 | Taskett |
| 5,839,113 | A | 11/1998 | Federau et al. | 5,991,413 | A | 11/1999 | Arditti et al. |
| 5,842,421 | A | 12/1998 | Desilets et al. | 5,991,736 | A | 11/1999 | Ferguson et al. |
| 5,845,259 | A | 12/1998 | West et al. | 5,991,743 | A | 11/1999 | Irving et al. |
| 5,845,260 | A | 12/1998 | Nakano et al. | 5,991,748 | A | 11/1999 | Taskett |
| 5,852,811 | A | 12/1998 | Atkins | 5,991,750 | A | 11/1999 | Watson |
| 5,852,812 | A | 12/1998 | Reeder | 5,999,596 | A | 12/1999 | Walker et al. |
| 5,857,079 | A | 1/1999 | Claus et al. | 5,999,624 | A | 12/1999 | Hopkins |
| 5,857,175 | A | 1/1999 | Day | 5,999,917 | A | 12/1999 | Facciani et al. |
| 5,857,709 | A | 1/1999 | Chock | 6,000,608 | A | 12/1999 | Dorf |
| 5,859,419 | A | 1/1999 | Wynn | 6,000,832 | A | 12/1999 | Franklin et al. |
| 5,864,609 | A | 1/1999 | Cross et al. | 6,002,383 | A | 12/1999 | Shimada |
| 5,864,828 | A | 1/1999 | Atkins | 6,003,762 | A | 12/1999 | Hayashida |
| 5,864,830 | A | 1/1999 | Armetta et al. | 6,004,681 | A | 12/1999 | Epstein et al. |
| RE36,116 | E | 2/1999 | McCarthy | 6,006,205 | A | 12/1999 | Loeb et al. |
| D405,111 | S | 2/1999 | Kara | 6,006,988 | A | 12/1999 | Behrmann et al. |
| 5,870,456 | A | 2/1999 | Rogers | 6,009,411 | A | 12/1999 | Kepecs |
| 5,870,718 | A | 2/1999 | Spector | 6,009,415 | A | 12/1999 | Shurling et al. |
| 5,870,721 | A | 2/1999 | Norris | 6,012,049 | A | 1/2000 | Kawan |
| 5,875,437 | A | 2/1999 | Atkins | 6,014,634 | A | 1/2000 | Scroggie et al. |
| 5,877,975 | A | 3/1999 | Jigour et al. | 6,014,636 | A | 1/2000 | Reeder |
| 5,883,377 | A | 3/1999 | Chapin, Jr. | 6,014,638 | A | 1/2000 | Burge et al. |
| 5,883,810 | A | 3/1999 | Franklin et al. | 6,014,645 | A | 1/2000 | Cunningham |
| 5,884,271 | A | 3/1999 | Pitroda | 6,014,749 | A | 1/2000 | Gloor et al. |
| 5,884,278 | A | 3/1999 | Powell | 6,016,482 | A | 1/2000 | Molinari et al. |
| 5,884,285 | A | 3/1999 | Atkins | 6,016,954 | A | 1/2000 | Abe et al. |
| 5,887,065 | A | 3/1999 | Audebert | 6,018,718 | A | 1/2000 | Walker et al. |
| 5,890,138 | A | 3/1999 | Godin et al. | 6,019,284 | A | 2/2000 | Freeman et al. |
| 5,890,140 | A | 3/1999 | Clark et al. | 6,021,189 | A | 2/2000 | Vu |
| H1794 | H | 4/1999 | Claus | 6,024,286 | A | 2/2000 | Bradley et al. |
| D408,054 | S | 4/1999 | Leedy, Jr. | 6,025,283 | A | 2/2000 | Roberts |
| 5,895,075 | A | 4/1999 | Edwards | 6,026,370 | A | 2/2000 | Jermyn |
| 5,897,620 | A | 4/1999 | Walker et al. | 6,029,139 | A | 2/2000 | Cunningham et al. |
| 5,897,621 | A | 4/1999 | Boesch et al. | 6,029,144 | A | 2/2000 | Barrett et al. |
| 5,901,303 | A | 5/1999 | Chew | 6,029,153 | A | 2/2000 | Bauchner et al. |
| 5,903,879 | A | 5/1999 | Mitchell | 6,029,890 | A | 2/2000 | Austin |
| 5,905,246 | A | 5/1999 | Fajkowski | 6,032,136 | A | 2/2000 | Brake, Jr. et al. |
| 5,907,142 | A | 5/1999 | Kelsey | 6,032,859 | A | 3/2000 | Muehlberger et al. |
| 5,907,350 | A | 5/1999 | Nemirofsky | 6,036,099 | A | 3/2000 | Leighton |
| 5,907,831 | A | 5/1999 | Lotvin et al. | 6,038,292 | A | 3/2000 | Thomas |
| 5,911,135 | A | 6/1999 | Atkins | 6,038,552 | A | 3/2000 | Fleischl et al. |
| 5,911,136 | A | 6/1999 | Atkins | 6,041,315 | A | 3/2000 | Pollin |
| 5,914,472 | A | 6/1999 | Foladare et al. | 6,044,360 | A | 3/2000 | Picciallo |
| 5,918,211 | A | 6/1999 | Sloane | 6,045,042 | A | 4/2000 | Ohno |
| 5,920,629 | A | 7/1999 | Rosen | 6,045,050 | A | 4/2000 | Ippolito et al. |
| 5,920,844 | A | 7/1999 | Hotta et al. | 6,047,067 | A | 4/2000 | Rosen |
| 5,920,847 | A | 7/1999 | Kolling et al. | 6,047,268 | A | 4/2000 | Bartoli et al. |
| 5,923,734 | A | 7/1999 | Taskett | 6,048,271 | A | 4/2000 | Barcelou |
| 5,926,792 | A | 7/1999 | Koppes et al. | 6,049,463 | A | 4/2000 | O'Malley et al. |
| 5,926,800 | A | 7/1999 | Baronowski et al. | 6,049,773 | A | 4/2000 | McCormack et al. |
| 5,928,082 | A | 7/1999 | Clapper, Jr. | 6,049,782 | A | 4/2000 | Gottesman et al. |
| 5,930,217 | A | 7/1999 | Kayanuma | 6,055,573 | A | 4/2000 | Gardenswartz et al. |
| 5,931,764 | A | 8/1999 | Freeman et al. | 6,058,378 | A | 5/2000 | Clark et al. |
| 5,933,812 | A | 8/1999 | Meyer et al. | 6,061,660 | A | 5/2000 | Eggleston et al. |
| 5,933,817 | A | 8/1999 | Hucal | 6,064,985 | A | 5/2000 | Anderson |
| 5,936,221 | A | 8/1999 | Corder et al. | 6,065,675 | A | 5/2000 | Teicher |
| 5,937,068 | A | 8/1999 | Audebert | 6,068,183 | A | 5/2000 | Freeman et al. |
| 5,940,811 | A | 8/1999 | Norris | 6,068,301 | A | 5/2000 | Han et al. |
| 5,946,669 | A | 8/1999 | Polk | 6,070,067 | A | 5/2000 | Nguyen et al. |
| 5,949,044 | A | 9/1999 | Walker et al. | 6,070,147 | A | 5/2000 | Harms et al. |
| 5,952,641 | A | 9/1999 | Korshun | 6,070,153 | A | 5/2000 | Simpson |
| 5,953,423 | A | 9/1999 | Rosen | D427,167 | S | 6/2000 | Iwasaki |
| 5,953,710 | A | 9/1999 | Fleming | 6,076,068 | A | 6/2000 | DeLapa et al. |
| 5,955,961 | A | 9/1999 | Wallerstein | 6,076,072 | A | 6/2000 | Libman |
| 5,956,695 | A | 9/1999 | Carrithers et al. | 6,078,888 | A | 6/2000 | Johnson, Jr. |
| 5,956,711 | A | 9/1999 | Sullivan et al. | 6,078,891 | A | 6/2000 | Riordan et al. |
| 5,960,411 | A | 9/1999 | Hartman et al. | 6,085,976 | A | 7/2000 | Scher |
| 5,963,648 | A | 10/1999 | Rosen | 6,089,284 | A | 7/2000 | Kaehler et al. |
| 5,963,925 | A | 10/1999 | Kolling et al. | 6,091,817 | A | 7/2000 | Bertina et al. |
| 5,970,469 | A | 10/1999 | Scroggie et al. | 6,092,056 | A | 7/2000 | Tull, Jr. et al. |
| 5,970,478 | A | 10/1999 | Walker et al. | 6,092,057 | A | 7/2000 | Zimmerman et al. |
| 5,970,479 | A | 10/1999 | Shepherd | 6,095,412 | A | 8/2000 | Bertina et al. |

| | | | | | | |
|---|---|---|---|---|---|---|
| 6,095,416 | A | 8/2000 | Grant et al. | 6,295,344 | B1 | 9/2001 | Marshall |
| 6,098,053 | A | 8/2000 | Slater | 6,295,522 | B1 | 9/2001 | Boesch |
| 6,105,006 | A | 8/2000 | Davis et al. | D449,336 | S | 10/2001 | Webb et al. |
| 6,105,007 | A | 8/2000 | Norris | 6,298,336 | B1 | 10/2001 | Davis et al. |
| 6,105,008 | A | 8/2000 | Davis et al. | 6,302,444 | B1 | 10/2001 | Cobben |
| 6,105,009 | A | 8/2000 | Cuervo | 6,308,268 | B1 | 10/2001 | Audebert |
| 6,105,011 | A | 8/2000 | Morrison, Jr. | 6,308,887 | B1 | 10/2001 | Korman et al. |
| 6,105,865 | A | 8/2000 | Hardesty | 6,315,193 | B1 | 11/2001 | Hogan |
| 6,108,642 | A | 8/2000 | Findley | 6,315,195 | B1 | 11/2001 | Ramachandran |
| 6,109,525 | A | 8/2000 | Blomqvist et al. | 6,315,196 | B1 | 11/2001 | Bachman |
| 6,112,190 | A | 8/2000 | Fletcher et al. | 6,321,211 | B1 | 11/2001 | Dodd |
| 6,112,191 | A | 8/2000 | Burke | 6,321,984 | B1 | 11/2001 | McCall |
| 6,115,458 | A | 9/2000 | Taskett | 6,324,524 | B1 | 11/2001 | Lent et al. |
| 6,119,097 | A | 9/2000 | Ibarra | 6,324,526 | B1 | 11/2001 | D'Agostino |
| 6,119,103 | A | 9/2000 | Basch et al. | 6,327,573 | B1 | 12/2001 | Walker et al. |
| 6,119,107 | A | 9/2000 | Polk | 6,327,575 | B1 | 12/2001 | Katz |
| 6,119,932 | A | 9/2000 | Maloney et al. | 6,330,543 | B1 | 12/2001 | Kepecs |
| 6,119,933 | A | 9/2000 | Wong et al. | 6,330,546 | B1 | 12/2001 | Gopinathan et al. |
| 6,122,623 | A | 9/2000 | Garman | 6,332,126 | B1 | 12/2001 | Peirce et al. |
| 6,128,598 | A | 10/2000 | Walker et al. | 6,332,128 | B1 | 12/2001 | Nicholson |
| 6,128,599 | A | 10/2000 | Walker et al. | 6,334,108 | B1 | 12/2001 | Deaton et al. |
| 6,129,274 | A | 10/2000 | Suzuki | 6,336,099 | B1 | 1/2002 | Barnett et al. |
| 6,129,572 | A | 10/2000 | Feldman et al. | 6,338,048 | B1 | 1/2002 | Mori |
| 6,134,309 | A | 10/2000 | Carson | 6,341,724 | B2 | 1/2002 | Campisano |
| 6,134,536 | A | 10/2000 | Shepherd | 6,343,743 | B1 | 2/2002 | Lamla |
| 6,138,911 | A | 10/2000 | Fredregill et al. | 6,344,108 | B1 | 2/2002 | Von Medvey et al. |
| 6,138,917 | A | 10/2000 | Chapin, Jr. | 6,345,261 | B1 | 2/2002 | Feidelson |
| 6,141,666 | A | 10/2000 | Tobin | 6,345,766 | B1 | 2/2002 | Taskett et al. |
| 6,142,640 | A | 11/2000 | Schofield | 6,349,290 | B1 | 2/2002 | Horowitz et al. |
| 6,144,848 | A | 11/2000 | Walsh et al. | 6,349,291 | B1 | 2/2002 | Varma |
| 6,145,741 | A | 11/2000 | Wisdom et al. | 6,349,972 | B1 | 2/2002 | Geiger et al. |
| 6,148,293 | A | 11/2000 | King | 6,351,735 | B1 | 2/2002 | Deaton et al. |
| 6,148,297 | A | 11/2000 | Swor et al. | 6,356,881 | B1 | 3/2002 | Milch et al. |
| 6,161,096 | A | 12/2000 | Bell | 6,360,209 | B1 | 3/2002 | Loeb et al. |
| 6,163,770 | A | 12/2000 | Gamble et al. | 6,360,954 | B1 | 3/2002 | Barnardo |
| 6,163,771 | A | 12/2000 | Walker et al. | 6,366,220 | B1 | 4/2002 | Elliott |
| 6,164,533 | A | 12/2000 | Barton | 6,366,967 | B1 | 4/2002 | Wagner |
| 6,164,548 | A | 12/2000 | Curiel | 6,373,969 | B1 | 4/2002 | Adler |
| 6,167,385 | A | 12/2000 | Hartley-Urquhart | 6,374,230 | B1 | 4/2002 | Walker et al. |
| 6,169,974 | B1 | 1/2001 | Baumgartner et al. | 6,377,669 | B1 | 4/2002 | Walker et al. |
| 6,169,975 | B1 | 1/2001 | White et al. | 6,377,935 | B1 | 4/2002 | Deaton et al. |
| 6,173,267 | B1 | 1/2001 | Cairns | 6,382,677 | B1 | 5/2002 | Kaule et al. |
| 6,179,211 | B1 | 1/2001 | Green et al. | 6,385,591 | B1 | 5/2002 | Mankoff |
| 6,182,048 | B1 | 1/2001 | Osborn et al. | 6,385,594 | B1 | 5/2002 | Lebda et al. |
| 6,182,059 | B1 | 1/2001 | Angotti et al. | 6,386,444 | B1 | 5/2002 | Sullivan |
| D437,882 | S | 2/2001 | Creighton | 6,397,202 | B1 | 5/2002 | Higgins et al. |
| 6,182,894 | B1 | 2/2001 | Hackett et al. | 6,401,074 | B1 | 6/2002 | Sleeper |
| 6,185,541 | B1 | 2/2001 | Scroggie et al. | 6,402,039 | B1 | 6/2002 | Freeman et al. |
| 6,186,793 | B1 | 2/2001 | Brubaker | 6,404,866 | B1 | 6/2002 | Hopper et al. |
| 6,188,309 | B1 | 2/2001 | Levine | 6,405,175 | B1 | 6/2002 | Ng |
| 6,189,787 | B1 | 2/2001 | Dorf | 6,405,181 | B2 | 6/2002 | Lent et al. |
| 6,192,113 | B1 | 2/2001 | Lorsch | 6,405,182 | B1 | 6/2002 | Cuervo |
| 6,192,142 | B1 | 2/2001 | Pare, Jr. et al. | 6,409,080 | B1 | 6/2002 | Kawagishi |
| 6,193,152 | B1 | 2/2001 | Fernando et al. | 6,409,593 | B1 | 6/2002 | Petrecca |
| 6,195,644 | B1 | 2/2001 | Bowie | 6,411,947 | B1 | 6/2002 | Rice et al. |
| 6,202,053 | B1 | 3/2001 | Christiansen et al. | 6,415,261 | B1 | 7/2002 | Cybul et al. |
| RE37,122 | E | 4/2001 | Levine et al. | 6,419,161 | B1 | 7/2002 | Haddad |
| 6,213,392 | B1 | 4/2001 | Zuppichich | 6,422,459 | B1 | 7/2002 | Kawan |
| 6,222,914 | B1 | 4/2001 | McMullin | 6,422,462 | B1 | 7/2002 | Cohen |
| 6,223,143 | B1 | 4/2001 | Weinstock et al. | 6,424,029 | B1 | 7/2002 | Giesler |
| D442,222 | S | 5/2001 | Webb et al. | 6,424,947 | B1 | 7/2002 | Tsuria et al. |
| D442,627 | S | 5/2001 | Webb et al. | 6,424,949 | B1 | 7/2002 | Deaton et al. |
| 6,227,445 | B1 | 5/2001 | Brookner | 6,424,951 | B1 | 7/2002 | Shurling et al. |
| 6,227,447 | B1 | 5/2001 | Campisano | 6,429,927 | B1 | 8/2002 | Borza |
| 6,227,972 | B1 | 5/2001 | Walker et al. | 6,434,259 | B1 | 8/2002 | Hamid et al. |
| 6,243,688 | B1 | 6/2001 | Kalina | 6,434,534 | B1 | 8/2002 | Walker et al. |
| 6,243,689 | B1 | 6/2001 | Norton | D462,477 | S | 9/2002 | Osborne |
| 6,260,758 | B1 | 7/2001 | Blumberg | D462,714 | S | 9/2002 | Creighton |
| 6,263,316 | B1 | 7/2001 | Khan et al. | 6,446,210 | B1 | 9/2002 | Borza |
| 6,265,977 | B1 | 7/2001 | Vega et al. | 6,450,407 | B1 | 9/2002 | Freeman et al. |
| 6,267,292 | B1 | 7/2001 | Walker et al. | 6,454,647 | B1 | 9/2002 | Woodbury, Jr. |
| 6,278,981 | B1 | 8/2001 | Dembo et al. | 6,456,981 | B1 | 9/2002 | Dejaeger et al. |
| 6,278,996 | B1 | 8/2001 | Richardson et al. | 6,457,640 | B2 | 10/2002 | Ramachandran et al. |
| 6,282,516 | B1 | 8/2001 | Giullani | 6,463,039 | B1 | 10/2002 | Ricci et al. |
| 6,282,522 | B1 | 8/2001 | Davis et al. | 6,467,684 | B2 | 10/2002 | Fite et al. |
| D447,515 | S | 9/2001 | Faenza, Jr. et al. | 6,470,306 | B1 | 10/2002 | Pringle et al. |
| 6,289,322 | B1 | 9/2001 | Kitchen et al. | 6,471,128 | B1 | 10/2002 | Corcoran et al. |
| 6,289,324 | B1 | 9/2001 | Kawan | 6,473,500 | B1 | 10/2002 | Risafi et al. |
| 6,292,786 | B1 | 9/2001 | Deaton et al. | 6,481,125 | B1 | 11/2002 | Pokrasoff |

| | | |
|---|---|---|
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,247 S | 12/2002 | Pentz |
| D467,271 S | 12/2002 | Haas |
| D467,272 S | 12/2002 | Haas |
| 6,488,206 B1 | 12/2002 | Flaig et al. |
| 6,490,568 B1 | 12/2002 | Omara et al. |
| 6,491,782 B1 | 12/2002 | Jaynes |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson et al. |
| 6,513,019 B2 | 1/2003 | Lewis |
| 6,516,302 B1 | 2/2003 | Deaton et al. |
| 6,529,880 B1 | 3/2003 | McKeen et al. |
| 6,529,940 B1 | 3/2003 | Humble |
| 6,553,113 B1 | 4/2003 | Dhir et al. |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,564,189 B1 | 5/2003 | Nycz |
| 6,567,786 B1 | 5/2003 | Bibelnieks et al. |
| 6,567,791 B2 | 5/2003 | Lent et al. |
| 6,567,821 B1 | 5/2003 | Polk |
| 6,571,216 B1 | 5/2003 | Garg et al. |
| 6,574,603 B1 | 6/2003 | Dickson et al. |
| 6,575,361 B1 | 6/2003 | Graves et al. |
| 6,578,012 B1 | 6/2003 | Storey |
| 6,581,831 B2 | 6/2003 | Madani |
| 6,581,839 B1 | 6/2003 | Lasch et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| D477,634 S | 7/2003 | Malone |
| 6,592,044 B1 | 7/2003 | Wong et al. |
| 6,594,640 B1 | 7/2003 | Postrel |
| 6,595,342 B1 | 7/2003 | Maritzen et al. |
| 6,601,040 B1 | 7/2003 | Kolls |
| 6,601,761 B1 | 8/2003 | Katis |
| 6,607,127 B2 | 8/2003 | Wong |
| 6,609,104 B1 | 8/2003 | Deaton et al. |
| 6,609,111 B1 | 8/2003 | Bell |
| 6,609,113 B1 | 8/2003 | O'Leary et al. |
| 6,609,654 B1 | 8/2003 | Anderson et al. |
| 6,609,658 B1 | 8/2003 | Sehr |
| 6,611,811 B1 | 8/2003 | Deaton et al. |
| 6,611,819 B1 | 8/2003 | Oneda |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,067 S | 10/2003 | Haas |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,647,376 B1 | 11/2003 | Farrar et al. |
| D483,407 S | 12/2003 | Ramnarine |
| 6,655,587 B2 | 12/2003 | Andrews et al. |
| 6,655,598 B1 | 12/2003 | Curiel |
| 6,659,259 B2 | 12/2003 | Knox et al. |
| 6,662,215 B1 | 12/2003 | Moskowitz et al. |
| 6,665,687 B1 | 12/2003 | Burke |
| 6,666,768 B1 | 12/2003 | Akers |
| 6,671,673 B1 | 12/2003 | Baseman et al. |
| D485,573 S | 1/2004 | Li |
| 6,672,624 B2 | 1/2004 | Fabel |
| 6,675,127 B2 | 1/2004 | LaBlanc et al. |
| 6,675,149 B1 | 1/2004 | Ruffin et al. |
| 6,681,988 B2 | 1/2004 | Stack et al. |
| 6,684,195 B1 | 1/2004 | Deaton et al. |
| 6,693,544 B1 | 2/2004 | Hebbecker |
| 6,697,799 B1 | 2/2004 | Neal et al. |
| 6,705,518 B2 | 3/2004 | Park et al. |
| 6,714,919 B1 | 3/2004 | Findley |
| 6,715,797 B2 | 4/2004 | Curiel |
| 6,718,313 B1 | 4/2004 | Lent et al. |
| 6,721,743 B1 | 4/2004 | Sakakibara |
| 6,725,106 B1 | 4/2004 | Covington |
| 6,726,813 B2 | 4/2004 | Kaule et al. |
| 6,727,802 B2 | 4/2004 | Kelly et al. |
| 6,732,081 B2 | 5/2004 | Nicholson |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,754,640 B2 | 6/2004 | Bozeman |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| D494,326 S | 8/2004 | Long |
| 6,778,967 B1 | 8/2004 | Nicholson |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,795,809 B2 | 9/2004 | O'Brien et al. |
| 6,795,812 B1 | 9/2004 | Lent et al. |
| 6,801,835 B2 | 10/2004 | Covington et al. |
| 6,802,008 B1 | 10/2004 | Ikefuji et al. |
| 6,804,786 B1 | 10/2004 | Chamley et al. |
| 6,805,287 B2 | 10/2004 | Bishop |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,817,008 B2 | 11/2004 | Ledford et al. |
| 6,817,521 B1 | 11/2004 | Matada |
| 6,820,061 B2 | 11/2004 | Postrel |
| 6,829,586 B2 | 12/2004 | Postrel |
| 6,834,796 B2 | 12/2004 | Anvekar et al. |
| 6,836,764 B1 | 12/2004 | Hucal |
| 6,842,739 B2 | 1/2005 | Postrel |
| 6,845,906 B2 | 1/2005 | Royer et al. |
| D501,875 S | 2/2005 | Dean |
| 6,856,973 B1 | 2/2005 | Bott |
| 6,857,566 B2 | 2/2005 | Wankmueller |
| RE38,717 E | 3/2005 | Bothwell et al. |
| 6,865,547 B1 | 3/2005 | Brake, Jr. et al. |
| 6,868,426 B1 | 3/2005 | Mankoff |
| 6,871,174 B1 | 3/2005 | Dolan et al. |
| 6,874,139 B2 | 3/2005 | Krueger et al. |
| 6,876,971 B1 | 4/2005 | Burke |
| 6,880,084 B1 | 4/2005 | Brittenham et al. |
| 6,885,994 B1 | 4/2005 | Scroggie et al. |
| 6,885,996 B2 | 4/2005 | Nicholson |
| 6,886,046 B2 | 4/2005 | Stutz et al. |
| 6,886,047 B2 | 4/2005 | Leong et al. |
| D505,450 S | 5/2005 | Lauer et al. |
| 6,886,741 B1 | 5/2005 | Salveson |
| 6,889,198 B2 | 5/2005 | Kawan |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,901,375 B2 | 5/2005 | Fernandez |
| 6,901,406 B2 | 5/2005 | Nabe et al. |
| 6,912,502 B1 | 6/2005 | Buddle et al. |
| D507,598 S | 7/2005 | Allard et al. |
| 6,913,193 B1 | 7/2005 | Kawan |
| 6,915,271 B1 | 7/2005 | Meyer et al. |

| | | |
|---|---|---|
| 6,920,611 B1 | 7/2005 | Spaeth et al. |
| 6,924,026 B1 | 8/2005 | Jaynes |
| 6,931,382 B2 | 8/2005 | Laage et al. |
| 6,938,156 B2 | 8/2005 | Wheeler et al. |
| RE38,801 E | 9/2005 | Rogers |
| 6,942,156 B2 | 9/2005 | Ohta et al. |
| 6,942,569 B2 | 9/2005 | Petrecca |
| 6,945,453 B1 | 9/2005 | Schwarz Jr. |
| 6,947,898 B2 | 9/2005 | Postrel |
| 6,950,940 B2 | 9/2005 | Wheeler et al. |
| 6,954,741 B1 | 10/2005 | Burchetta et al. |
| 6,961,710 B1 | 11/2005 | Yanagisawa et al. |
| 6,963,850 B1 | 11/2005 | Bezos et al. |
| 6,963,857 B1 | 11/2005 | Johnson |
| 6,968,348 B1 | 11/2005 | Carone et al. |
| 6,970,830 B1 | 11/2005 | Samra et al. |
| 6,978,369 B2 | 12/2005 | Wheeler et al. |
| 6,985,879 B2 | 1/2006 | Walker et al. |
| 6,993,498 B1 | 1/2006 | Deaton et al. |
| 6,999,569 B2 | 2/2006 | Risafi et al. |
| 6,999,938 B1 | 2/2006 | Libman |
| 6,999,943 B1 | 2/2006 | Johnson et al. |
| 7,003,476 B1 | 2/2006 | Samra et al. |
| 7,006,979 B1 | 2/2006 | Samra et al. |
| 7,006,992 B1 | 2/2006 | Packwood |
| 7,010,495 B1 | 3/2006 | Samra et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,908 B1 | 4/2006 | Huang et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,063,924 B2 | 6/2006 | Kaminsky et al. |
| 7,066,382 B2 | 6/2006 | Kaplan |
| 7,069,244 B2 | 6/2006 | Strayer et al. |
| D524,859 S | 7/2006 | Graves et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,458 B2 | 7/2006 | Lawlor et al. |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,090,138 B2 | 8/2006 | Rettenmyer et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D530,741 S | 10/2006 | Blossom |
| 7,120,601 B2 | 10/2006 | Chen et al. |
| 7,121,471 B2 | 10/2006 | Beenau et al. |
| 7,128,272 B2 | 10/2006 | Doublet |
| 7,143,063 B2 | 11/2006 | Lent et al. |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,171,385 B1 | 1/2007 | Dembo et al. |
| 7,174,312 B2 | 2/2007 | Harper et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |
| 7,228,155 B2 | 6/2007 | Saunders |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,097 B2 | 7/2007 | Hutchison et al. |
| 7,249,099 B2 | 7/2007 | Ling |
| 7,249,112 B2 | 7/2007 | Berardi et al. |
| 7,252,223 B2 | 8/2007 | Schofield |
| 7,252,226 B2 | 8/2007 | Risafi et al. |
| 7,254,556 B2 | 8/2007 | Fry |
| 7,254,560 B2 | 8/2007 | Singhal |
| 7,260,549 B2 | 8/2007 | Spielmann et al. |
| D551,705 S | 9/2007 | Mershon |
| 7,266,524 B1 | 9/2007 | Butcher, III |
| 7,269,737 B2 | 9/2007 | Robinson |
| 7,275,160 B2 | 9/2007 | Pearson et al. |
| 7,295,999 B1 | 11/2007 | Simon et al. |
| 7,306,141 B1 | 12/2007 | Schwarz, Jr. |
| 7,306,163 B2 | 12/2007 | Scholz et al. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,318,049 B2 | 1/2008 | Iannacci |
| D562,888 S | 2/2008 | Brown |
| 7,328,181 B2 | 2/2008 | Sutton et al. |
| 7,333,948 B2 | 2/2008 | Bell et al. |
| 7,340,431 B1 | 3/2008 | McManus et al. |
| 7,346,562 B2 | 3/2008 | Inoue et al. |
| 7,346,567 B2 | 3/2008 | Weeks |
| 7,349,866 B2 | 3/2008 | Schwarz, Jr. |
| 7,356,516 B2 | 4/2008 | Richey et al. |
| 7,357,331 B2 | 4/2008 | Blossom |
| 7,359,880 B2 | 4/2008 | Abel et al. |
| 7,360,693 B1 | 4/2008 | Sullivan |
| 7,370,004 B1 | 5/2008 | Patel et al. |
| 7,383,204 B2 | 6/2008 | McCall |
| 7,387,238 B2 | 6/2008 | Foss, Jr. et al. |
| 7,392,221 B2 | 6/2008 | Nabe et al. |
| 7,392,222 B1 | 6/2008 | Hamilton et al. |
| 7,392,224 B1 | 6/2008 | Bauer et al. |
| D573,182 S | 7/2008 | Ricketts et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,401,731 B1 | 7/2008 | Pletz et al. |
| 7,409,364 B1 | 8/2008 | Barton et al. |
| D576,671 S | 9/2008 | Field et al. |
| 7,424,732 B2 | 9/2008 | Matsumoto et al. |
| D582,476 S | 12/2008 | Field et al. |
| D582,977 S | 12/2008 | Field et al. |
| 7,461,028 B2 | 12/2008 | Wronski, Jr. |
| 7,467,096 B2 | 12/2008 | Antonucci et al. |
| 7,479,320 B2 | 1/2009 | Keller et al. |
| 7,493,269 B2 | 2/2009 | Fostick et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |
| 7,506,804 B2 | 3/2009 | Zajkowski et al. |
| 7,506,806 B2 | 3/2009 | Bonalle et al. |
| 7,512,551 B2 | 3/2009 | Postrel |
| 7,523,385 B2 | 4/2009 | Nguyen et al. |
| 7,530,491 B2 | 5/2009 | Lasch et al. |
| 7,542,922 B2 | 6/2009 | Bennett et al. |
| 7,546,266 B2 | 6/2009 | Beirne et al. |
| 7,580,857 B2 | 8/2009 | VanFleet et al. |
| 7,584,133 B2 | 9/2009 | Horowitz |
| 7,587,363 B2 | 9/2009 | Cataline et al. |
| 7,588,184 B2 | 9/2009 | Gandel et al. |
| 7,591,416 B2 | 9/2009 | Blossom |
| 7,593,875 B2 | 9/2009 | Granite et al. |
| D602,522 S | 10/2009 | Field et al. |
| D602,986 S | 10/2009 | Skelding et al. |
| 7,606,730 B2 | 10/2009 | Antonucci |
| 7,613,629 B2 | 11/2009 | Antonucci et al. |
| D604,983 S | 12/2009 | Rossell |
| 7,630,926 B2 | 12/2009 | Chakiris et al. |
| 7,630,935 B2 | 12/2009 | Loeger et al. |
| 7,640,205 B2 | 12/2009 | Michelassi et al. |
| 7,653,560 B2 | 1/2010 | Hueler |
| 7,660,763 B1 | 2/2010 | Brake, Jr. et al. |

| | | |
|---|---|---|
| 7,669,759 B1 | 3/2010 | Zettner |
| 7,676,425 B1 | 3/2010 | Noles |
| 7,676,459 B2 | 3/2010 | Carone et al. |
| 7,686,218 B2 | 3/2010 | Hessburg et al. |
| 7,689,504 B2 | 3/2010 | Warren et al. |
| 7,707,111 B2 | 4/2010 | Brake, Jr. et al. |
| 7,720,707 B1 | 5/2010 | Mowry |
| 7,729,925 B2 | 6/2010 | Maritzen et al. |
| 7,729,980 B2 | 6/2010 | Mittenzwei et al. |
| 7,742,942 B2 | 6/2010 | Nicholson |
| 7,742,970 B2 | 6/2010 | Thierer et al. |
| 7,747,463 B1 | 6/2010 | Phillips et al. |
| 7,747,525 B2 | 6/2010 | Grant et al. |
| 7,753,259 B1 | 7/2010 | Taylor et al. |
| 7,801,799 B1 | 9/2010 | Brake, Jr. et al. |
| 7,801,816 B2 | 9/2010 | Alarcon Luther et al. |
| 7,827,058 B2 | 11/2010 | Mortimer |
| 7,870,071 B2 | 1/2011 | Gupta |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0014868 A1 | 8/2001 | Herz et al. |
| 2001/0023407 A1 | 9/2001 | Liyanearachchi et al. |
| 2001/0025253 A1 | 9/2001 | Heintz et al. |
| 2001/0027389 A1 | 10/2001 | Beverina et al. |
| 2001/0027441 A1 | 10/2001 | Wankmueller |
| 2001/0029490 A1 | 10/2001 | Inamochi |
| 2001/0032312 A1 | 10/2001 | Runje et al. |
| 2001/0034647 A1 | 10/2001 | Marks et al. |
| 2001/0034651 A1 | 10/2001 | Marks et al. |
| 2001/0034663 A1 | 10/2001 | Teveler et al. |
| 2001/0034682 A1 | 10/2001 | Knight et al. |
| 2001/0034684 A1 | 10/2001 | Cushing et al. |
| 2001/0034718 A1 | 10/2001 | Shaked et al. |
| 2001/0034720 A1 | 10/2001 | Armes |
| 2001/0037243 A1 | 11/2001 | Rouston et al. |
| 2001/0037276 A1 | 11/2001 | Kelly et al. |
| 2001/0037299 A1 | 11/2001 | Nichols et al. |
| 2001/0037315 A1 | 11/2001 | Saliba et al. |
| 2001/0038033 A1 | 11/2001 | Habib |
| 2001/0039511 A1 | 11/2001 | Duckworth et al. |
| 2001/0044293 A1 | 11/2001 | Morgan |
| 2001/0044733 A1 | 11/2001 | Lee et al. |
| 2001/0044764 A1 | 11/2001 | Arnold |
| 2001/0047332 A1 | 11/2001 | Gonen-Friedman et al. |
| 2001/0047342 A1 | 11/2001 | Cuervo |
| 2001/0049628 A1 | 12/2001 | Icho |
| 2001/0051917 A1 | 12/2001 | Bissonette et al. |
| 2001/0054003 A1 | 12/2001 | Chien et al. |
| 2001/0056398 A1 | 12/2001 | Scheirer |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010591 A1 | 1/2002 | Pomerance |
| 2002/0010621 A1 | 1/2002 | Bell et al. |
| 2002/0011517 A1 | 1/2002 | Namekawa et al. |
| 2002/0013751 A1 | 1/2002 | Facciani et al. |
| 2002/0019793 A1 | 2/2002 | Frattalone |
| 2002/0019803 A1 | 2/2002 | Muller |
| 2002/0026365 A1 | 2/2002 | Natanzon |
| 2002/0026416 A1 | 2/2002 | Provinse |
| 2002/0026418 A1 | 2/2002 | Koppel et al. |
| 2002/0029191 A1 | 3/2002 | Ishibashi et al. |
| 2002/0032609 A1 | 3/2002 | Wilkman |
| 2002/0032622 A1 | 3/2002 | Petit et al. |
| 2002/0035527 A1 | 3/2002 | Corrin |
| 2002/0040344 A1 | 4/2002 | Preiser et al. |
| 2002/0042742 A1 | 4/2002 | Glover et al. |
| 2002/0042743 A1 | 4/2002 | Ortiz et al. |
| 2002/0042774 A1 | 4/2002 | Ortiz et al. |
| 2002/0046089 A1 | 4/2002 | Zorn |
| 2002/0046106 A1 | 4/2002 | Ishibashi et al. |
| 2002/0046110 A1 | 4/2002 | Gallagher |
| 2002/0046116 A1 | 4/2002 | Hohle et al. |
| 2002/0046255 A1 | 4/2002 | Moore et al. |
| 2002/0049605 A1 | 4/2002 | Hagi |
| 2002/0052778 A1 | 5/2002 | Murphy et al. |
| 2002/0055874 A1 | 5/2002 | Cohen |
| 2002/0059103 A1 | 5/2002 | Anderson et al. |
| 2002/0059139 A1 | 5/2002 | Evans |
| 2002/0062235 A1 | 5/2002 | Wahlbin et al. |
| 2002/0062249 A1 | 5/2002 | Iannacci |
| 2002/0062253 A1 | 5/2002 | Dosh et al. |
| 2002/0062257 A1 | 5/2002 | Minamishin et al. |
| 2002/0065720 A1 | 5/2002 | Carswell et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069122 A1 | 6/2002 | Yun et al. |
| 2002/0069158 A1 | 6/2002 | Larkin et al. |
| 2002/0070270 A1 | 6/2002 | Narita et al. |
| 2002/0070976 A1 | 6/2002 | Tanner et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0073030 A1 | 6/2002 | Offer |
| 2002/0073042 A1 | 6/2002 | Maritzen et al. |
| 2002/0077890 A1 | 6/2002 | LaPointe et al. |
| 2002/0077895 A1 | 6/2002 | Howell |
| 2002/0077904 A1 | 6/2002 | Ali |
| 2002/0077964 A1 | 6/2002 | Brody et al. |
| 2002/0077966 A1 | 6/2002 | Harycki et al. |
| 2002/0077978 A1 | 6/2002 | O'Leary et al. |
| 2002/0082962 A1 | 6/2002 | Farris et al. |
| 2002/0082990 A1 | 6/2002 | Jones |
| 2002/0087349 A1 | 7/2002 | Wong |
| 2002/0087373 A1 | 7/2002 | Dickstein et al. |
| 2002/0091567 A1 | 7/2002 | Royston |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0099586 A1 | 7/2002 | Bladen et al. |
| 2002/0099601 A1 | 7/2002 | Farrell |
| 2002/0099649 A1 | 7/2002 | Lee et al. |
| 2002/0099667 A1 | 7/2002 | Diamandis et al. |
| 2002/0103852 A1 | 8/2002 | Pushka |
| 2002/0104878 A1 | 8/2002 | Seifert et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111886 A1 | 8/2002 | Chenevich et al. |
| 2002/0111891 A1 | 8/2002 | Hoffman et al. |
| 2002/0111916 A1 | 8/2002 | Coronna et al. |
| 2002/0116266 A1 | 8/2002 | Marshall |
| 2002/0116271 A1 | 8/2002 | Mankoff |
| 2002/0116330 A1 | 8/2002 | Hed et al. |
| 2002/0116331 A1 | 8/2002 | Cataline et al. |
| 2002/0117541 A1 | 8/2002 | Biggar et al. |
| 2002/0120497 A1 | 8/2002 | King |
| 2002/0120514 A1 | 8/2002 | Hagmeier et al. |
| 2002/0120571 A1 | 8/2002 | Maung et al. |
| 2002/0120627 A1 | 8/2002 | Mankoff |
| 2002/0120642 A1 | 8/2002 | Fetherston |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128916 A1 | 9/2002 | Beinecke |
| 2002/0129221 A1 | 9/2002 | Borgin et al. |
| 2002/0133401 A1 | 9/2002 | Mount et al. |
| 2002/0133461 A1 | 9/2002 | Ramachandran |
| 2002/0138409 A1 | 9/2002 | Bass |
| 2002/0138418 A1 | 9/2002 | Zarin et al. |
| 2002/0143614 A1 | 10/2002 | MacLean et al. |
| 2002/0143621 A1 | 10/2002 | Donnelly et al. |
| 2002/0143626 A1 | 10/2002 | Voltmer et al. |
| 2002/0143703 A1 | 10/2002 | Razvan et al. |
| 2002/0145039 A1 | 10/2002 | Carroll |
| 2002/0147633 A1 | 10/2002 | Rafizadeh |
| 2002/0147662 A1 | 10/2002 | Anderson |
| 2002/0147683 A1 | 10/2002 | Capobianco et al. |
| 2002/0147691 A1 | 10/2002 | Davis et al. |
| 2002/0152116 A1 | 10/2002 | Yan et al. |
| 2002/0152118 A1 | 10/2002 | Hadjigeorgis |

| | | | | | | |
|---|---|---|---|---|---|---|
| 2002/0152123 A1 | 10/2002 | Giordano et al. | | 2003/0074290 A1 | 4/2003 | Clore |
| 2002/0152168 A1 | 10/2002 | Neofytides et al. | | 2003/0078815 A1 | 4/2003 | Parsons |
| 2002/0152179 A1 | 10/2002 | Racov | | 2003/0078851 A1 | 4/2003 | Weng |
| 2002/0156723 A1 | 10/2002 | Lilly et al. | | 2003/0078881 A1 | 4/2003 | Elliott et al. |
| 2002/0161630 A1 | 10/2002 | Kern et al. | | 2003/0083933 A1 | 5/2003 | McAlear |
| 2002/0161641 A1 | 10/2002 | Quinlan et al. | | 2003/0085272 A1 | 5/2003 | Andrews et al. |
| 2002/0161699 A1 | 10/2002 | Okamoto et al. | | 2003/0085286 A1 | 5/2003 | Kelley et al. |
| 2002/0161702 A1 | 10/2002 | Milberger et al. | | 2003/0088462 A1 | 5/2003 | Carrither et al. |
| 2002/0165771 A1 | 11/2002 | Walker et al. | | 2003/0088470 A1 | 5/2003 | Cuervo |
| 2002/0165808 A1 | 11/2002 | Zamsky et al. | | 2003/0097298 A1 | 5/2003 | Klimpl et al. |
| 2002/0165820 A1 | 11/2002 | Anvekar et al. | | 2003/0101119 A1 | 5/2003 | Parsons et al. |
| 2002/0165829 A1 | 11/2002 | Jones et al. | | 2003/0105664 A1 | 6/2003 | Van Luchene |
| 2002/0169671 A1 | 11/2002 | Junger | | 2003/0105672 A1 | 6/2003 | Epstein et al. |
| 2002/0169719 A1 | 11/2002 | Dively et al. | | 2003/0105688 A1 | 6/2003 | Brown et al. |
| 2002/0174011 A1 | 11/2002 | Sanchez et al. | | 2003/0105689 A1 | 6/2003 | Chandak et al. |
| 2002/0174016 A1 | 11/2002 | Cuervo | | 2003/0110111 A1 | 6/2003 | Nalebuff et al. |
| 2002/0174018 A1 | 11/2002 | Bunger et al. | | 2003/0115100 A1 | 6/2003 | Teicher |
| 2002/0174030 A1 | 11/2002 | Praisner et al. | | 2003/0115102 A1 | 6/2003 | Mothwurf |
| 2002/0178025 A1 | 11/2002 | Hansen et al. | | 2003/0120544 A1 | 6/2003 | Gritzbach et al. |
| 2002/0178056 A1 | 11/2002 | Lim | | 2003/0120571 A1 | 6/2003 | Blagg |
| 2002/0178063 A1 | 11/2002 | Gravelle et al. | | 2003/0125969 A1 | 7/2003 | Kizer et al. |
| 2002/0178112 A1 | 11/2002 | Goeller et al. | | 2003/0126011 A1 | 7/2003 | Bryman et al. |
| 2002/0187825 A1 | 12/2002 | Tracy et al. | | 2003/0126017 A1 | 7/2003 | Rau et al. |
| 2002/0188478 A1 | 12/2002 | Breeland et al. | | 2003/0130940 A1 | 7/2003 | Hansen et al. |
| 2002/0188509 A1 | 12/2002 | Ariff et al. | | 2003/0130948 A1 | 7/2003 | Algiene et al. |
| 2002/0188511 A1 | 12/2002 | Johnson et al. | | 2003/0135453 A1 | 7/2003 | Caulfield et al. |
| 2002/0188533 A1 | 12/2002 | Sanchez et al. | | 2003/0135459 A1 | 7/2003 | Abelman et al. |
| 2002/0188565 A1 | 12/2002 | Nakamura et al. | | 2003/0135462 A1 | 7/2003 | Brake, Jr. et al. |
| 2002/0190123 A1 | 12/2002 | Anvekar et al. | | 2003/0140004 A1 | 7/2003 | O'Leary et al. |
| 2002/0194071 A1 | 12/2002 | Yoshizaki et al. | | 2003/0144902 A1 | 7/2003 | Bowie |
| 2002/0194081 A1 | 12/2002 | Perkowski | | 2003/0144935 A1 | 7/2003 | Sobek |
| 2002/0194098 A1 | 12/2002 | Stiff et al. | | 2003/0149629 A1 | 8/2003 | Claridge et al. |
| 2002/0194119 A1 | 12/2002 | Wright et al. | | 2003/0149660 A1 | 8/2003 | Canfield |
| 2002/0198803 A1 | 12/2002 | Rowe | | 2003/0154125 A1 | 8/2003 | Mittal et al. |
| 2002/0198807 A1 | 12/2002 | Kobayashi et al. | | 2003/0154163 A1 | 8/2003 | Phillips et al. |
| 2002/0198848 A1 | 12/2002 | Michener | | 2003/0158776 A1 | 8/2003 | Landesmann |
| 2003/0004794 A1 | 1/2003 | Hamilton | | 2003/0158782 A1 | 8/2003 | Thomson et al. |
| 2003/0004803 A1 | 1/2003 | Glover et al. | | 2003/0158818 A1 | 8/2003 | George et al. |
| 2003/0004809 A1 | 1/2003 | Palcic et al. | | 2003/0163403 A1 | 8/2003 | Chen et al. |
| 2003/0004828 A1 | 1/2003 | Epstein | | 2003/0163416 A1 | 8/2003 | Kitajima |
| 2003/0005288 A1 | 1/2003 | Moskowitz et al. | | 2003/0167218 A1 | 9/2003 | Field et al. |
| 2003/0009358 A1 | 1/2003 | Greenfeld et al. | | 2003/0167220 A1 | 9/2003 | Schoen et al. |
| 2003/0009374 A1 | 1/2003 | Moodie et al. | | 2003/0171992 A1 | 9/2003 | Blagg et al. |
| 2003/0009379 A1 | 1/2003 | Narasimhan et al. | | 2003/0172040 A1 | 9/2003 | Kemper et al. |
| 2003/0009393 A1 | 1/2003 | Norris | | 2003/0177079 A1 | 9/2003 | Krajewski et al. |
| 2003/0010831 A1 | 1/2003 | Ye | | 2003/0182218 A1 | 9/2003 | Blagg |
| 2003/0018488 A1 | 1/2003 | Elhaoussine et al. | | 2003/0182246 A1 | 9/2003 | Johnson et al. |
| 2003/0018523 A1 | 1/2003 | Rappaport et al. | | 2003/0182247 A1 | 9/2003 | Mobed et al. |
| 2003/0018613 A1 | 1/2003 | Oytac | | 2003/0187787 A1 | 10/2003 | Freund |
| 2003/0023549 A1 | 1/2003 | Armes et al. | | 2003/0195805 A1 | 10/2003 | Storey |
| 2003/0023557 A1 | 1/2003 | Moore | | 2003/0195808 A1 | 10/2003 | Brown et al. |
| 2003/0028483 A1 | 2/2003 | Sanders et al. | | 2003/0195842 A1 | 10/2003 | Reece |
| 2003/0028518 A1 | 2/2003 | Mankoff | | 2003/0200141 A1 | 10/2003 | Robison |
| 2003/0031321 A1 | 2/2003 | Mages | | 2003/0200142 A1 | 10/2003 | Hicks et al. |
| 2003/0033211 A1 | 2/2003 | Haines et al. | | 2003/0200143 A9 | 10/2003 | Walker et al. |
| 2003/0033246 A1 | 2/2003 | Slater | | 2003/0200179 A1 | 10/2003 | Kwan |
| 2003/0033252 A1 | 2/2003 | Buttridge et al. | | 2003/0200180 A1 | 10/2003 | Phelan et al. |
| 2003/0034388 A1 | 2/2003 | Routhenstein et al. | | 2003/0204421 A1 | 10/2003 | Houle et al. |
| 2003/0036952 A1 | 2/2003 | Panttaja et al. | | 2003/0205616 A1 | 11/2003 | Graves |
| 2003/0040927 A1 | 2/2003 | Sato et al. | | 2003/0205617 A1 | 11/2003 | Allen et al. |
| 2003/0040959 A1 | 2/2003 | Fei et al. | | 2003/0208400 A1 | 11/2003 | Kuo et al. |
| 2003/0040964 A1 | 2/2003 | Lacek | | 2003/0208403 A1 | 11/2003 | Fisher et al. |
| 2003/0046249 A1 | 3/2003 | Wu | | 2003/0208439 A1 | 11/2003 | Rast |
| 2003/0046542 A1 | 3/2003 | Chen et al. | | 2003/0212595 A1 | 11/2003 | Antonucci |
| 2003/0048888 A1 | 3/2003 | Hopper et al. | | 2003/0212630 A1 | 11/2003 | Kahr |
| 2003/0050831 A1 | 3/2003 | Klayh | | 2003/0213843 A1 | 11/2003 | Jackson |
| 2003/0053609 A1 | 3/2003 | Risafi et al. | | 2003/0216947 A1 | 11/2003 | Callen et al. |
| 2003/0055780 A1 | 3/2003 | Hansen et al. | | 2003/0216964 A1 | 11/2003 | MacLean et al. |
| 2003/0055782 A1 | 3/2003 | Slater | | 2003/0216965 A1 | 11/2003 | Libman |
| 2003/0061093 A1 | 3/2003 | Todd | | 2003/0216967 A1 | 11/2003 | Williams |
| 2003/0061097 A1 | 3/2003 | Walker et al. | | 2003/0216998 A1 | 11/2003 | Chang et al. |
| 2003/0061098 A1 | 3/2003 | Meyer | | 2003/0217003 A1 | 11/2003 | Weinflash et al. |
| 2003/0061157 A1 | 3/2003 | Hirka et al. | | 2003/0217005 A1 | 11/2003 | Drummond et al. |
| 2003/0061168 A1 | 3/2003 | Routhenstein | | 2003/0217329 A1 | 11/2003 | Good |
| 2003/0064788 A1 | 4/2003 | Walker et al. | | 2003/0218062 A1 | 11/2003 | Noriega et al. |
| 2003/0065618 A1 | 4/2003 | VanDeBoe, Jr. | | 2003/0218066 A1 | 11/2003 | Fernandes et al. |
| 2003/0065624 A1 | 4/2003 | James et al. | | 2003/0220834 A1 | 11/2003 | Leung et al. |
| 2003/0069808 A1 | 4/2003 | Cardno | | 2003/0222136 A1 | 12/2003 | Bolle et al. |
| 2003/0074167 A1 | 4/2003 | Browne et al. | | 2003/0225618 A1 | 12/2003 | Hessburg et al. |

| | | | | | | |
|---|---|---|---|---|---|---|
| 2003/0225619 A1 | 12/2003 | Dokken et al. | | 2004/0249764 A1 | 12/2004 | Delitz et al. |
| 2003/0229525 A1 | 12/2003 | Callahan et al. | | 2004/0252012 A1 | 12/2004 | Beenau et al. |
| 2003/0229589 A1 | 12/2003 | Rosenblatt et al. | | 2004/0260608 A1 | 12/2004 | Lewis et al. |
| 2003/0229590 A1 | 12/2003 | Byrne et al. | | 2004/0262386 A1 | 12/2004 | Abrams et al. |
| 2003/0233255 A1 | 12/2003 | Dirienzo | | 2005/0004839 A1 | 1/2005 | Bakker et al. |
| 2003/0233278 A1 | 12/2003 | Marshall | | 2005/0004864 A1 | 1/2005 | Lent et al. |
| 2003/0236712 A1 | 12/2003 | Antonucci et al. | | 2005/0006286 A1 | 1/2005 | Fery et al. |
| 2004/0002916 A1 | 1/2004 | Timmerman et al. | | 2005/0015300 A1 | 1/2005 | Smith et al. |
| 2004/0006487 A1 | 1/2004 | Tari | | 2005/0021353 A1 | 1/2005 | Aviles et al. |
| 2004/0010447 A1 | 1/2004 | Asayama | | 2005/0021363 A1 | 1/2005 | Stimson et al. |
| 2004/0010462 A1 | 1/2004 | Moon et al. | | 2005/0021400 A1 | 1/2005 | Postrel |
| 2004/0015394 A1 | 1/2004 | Mok et al. | | 2005/0021405 A1 | 1/2005 | Agarwal |
| 2004/0024672 A1 | 2/2004 | Brake, Jr. et al. | | 2005/0021457 A1 | 1/2005 | Johnson et al. |
| 2004/0024693 A1 | 2/2004 | Lawrence | | 2005/0023346 A1 | 2/2005 | Bakker et al. |
| 2004/0029569 A1 | 2/2004 | Khan et al. | | 2005/0027649 A1 | 2/2005 | Cech |
| 2004/0030626 A1 | 2/2004 | Libman | | 2005/0033619 A1 | 2/2005 | Barnes et al. |
| 2004/0039588 A1 | 2/2004 | Libman | | 2005/0033637 A1 | 2/2005 | Underwood |
| 2004/0039686 A1 | 2/2004 | Klebanoff | | 2005/0033643 A1 | 2/2005 | Smith et al. |
| 2004/0044606 A1 | 3/2004 | Buttridge et al. | | 2005/0035192 A1 | 2/2005 | Bonalle et al. |
| 2004/0049427 A1 | 3/2004 | Tami et al. | | 2005/0035847 A1 | 2/2005 | Bonalle et al. |
| 2004/0049452 A1 | 3/2004 | Blagg | | 2005/0040242 A1 | 2/2005 | Beenau et al. |
| 2004/0054586 A1 | 3/2004 | Tomita et al. | | 2005/0049950 A1 | 3/2005 | Johnson |
| 2004/0059634 A1 | 3/2004 | Tami et al. | | 2005/0049965 A1 | 3/2005 | Jen |
| 2004/0059952 A1 | 3/2004 | Newport et al. | | 2005/0055270 A1 | 3/2005 | Broe |
| 2004/0064332 A1 | 4/2004 | Zou et al. | | 2005/0060260 A1 | 3/2005 | Masuda et al. |
| 2004/0064401 A1 | 4/2004 | Palaghita et al. | | 2005/0065877 A1 | 3/2005 | Cleary et al. |
| 2004/0064402 A1 | 4/2004 | Dreyer et al. | | 2005/0071225 A1 | 3/2005 | Bortolin et al. |
| 2004/0078324 A1 | 4/2004 | Lonnberg et al. | | 2005/0071226 A1 | 3/2005 | Nguyen et al. |
| 2004/0078328 A1 | 4/2004 | Talbert et al. | | 2005/0071227 A1 | 3/2005 | Hammad et al. |
| 2004/0078332 A1 | 4/2004 | Ferguson et al. | | 2005/0071230 A1 | 3/2005 | Mankoff |
| 2004/0088236 A1 | 5/2004 | Manning | | 2005/0075889 A1 | 4/2005 | Gomes et al. |
| 2004/0088238 A1 | 5/2004 | Gilson et al. | | 2005/0075927 A1 | 4/2005 | Nash |
| 2004/0093296 A1 | 5/2004 | Phelan et al. | | 2005/0075932 A1 | 4/2005 | Mankoff |
| 2004/0093303 A1 | 5/2004 | Picciallo | | 2005/0077349 A1 | 4/2005 | Bonalle et al. |
| 2004/0094624 A1 | 5/2004 | Fernandes et al. | | 2005/0077350 A1 | 4/2005 | Courtion et al. |
| 2004/0098351 A1 | 5/2004 | Duke | | 2005/0080672 A1 | 4/2005 | Courtion et al. |
| 2004/0103431 A1 | 5/2004 | Davenport et al. | | 2005/0080726 A1 | 4/2005 | Krajewski et al. |
| 2004/0107161 A1 | 6/2004 | Tanaka et al. | | 2005/0086103 A1 | 4/2005 | Agura et al. |
| 2004/0111363 A1 | 6/2004 | Trench et al. | | 2005/0086160 A1 | 4/2005 | Wong et al. |
| 2004/0111371 A1 | 6/2004 | Friedman | | 2005/0086166 A1 | 4/2005 | Monk et al. |
| 2004/0117202 A1 | 6/2004 | Winklevoss et al. | | 2005/0091104 A1 | 4/2005 | Abraham |
| 2004/0118914 A1 | 6/2004 | Smith et al. | | 2005/0091138 A1 | 4/2005 | Awatsu |
| 2004/0122736 A1 | 6/2004 | Strock et al. | | 2005/0091492 A1 | 4/2005 | Benson et al. |
| 2004/0128186 A1 | 7/2004 | Breslin et al. | | 2005/0096976 A1 | 5/2005 | Nelms |
| 2004/0128195 A1 | 7/2004 | Sorem | | 2005/0097033 A1 | 5/2005 | Pretell et al. |
| 2004/0128197 A1 | 7/2004 | Bam et al. | | 2005/0102178 A1 | 5/2005 | Phillips et al. |
| 2004/0128217 A1 | 7/2004 | Friedman et al. | | 2005/0102209 A1 | 5/2005 | Sagrillo et al. |
| 2004/0128248 A1 | 7/2004 | Fujihara et al. | | 2005/0102228 A1 | 5/2005 | Srinivasan et al. |
| 2004/0133787 A1 | 7/2004 | Doughty et al. | | 2005/0108064 A1 | 5/2005 | Castleman et al. |
| 2004/0138991 A1 | 7/2004 | Song et al. | | 2005/0108090 A1 | 5/2005 | Takeda et al. |
| 2004/0143526 A1 | 7/2004 | Monasterio et al. | | 2005/0108096 A1 | 5/2005 | Burger et al. |
| 2004/0149544 A1 | 8/2004 | Dal Ferro | | 2005/0108102 A1 | 5/2005 | York |
| 2004/0158517 A1 | 8/2004 | Mahaney et al. | | 2005/0108151 A1 | 5/2005 | York |
| 2004/0159700 A1 | 8/2004 | Khan et al. | | 2005/0108152 A1 | 5/2005 | Tsoa-Lee et al. |
| 2004/0172350 A1 | 9/2004 | Atkinson et al. | | 2005/0114883 A1 | 5/2005 | Nagai et al. |
| 2004/0172358 A1 | 9/2004 | Lent et al. | | 2005/0119938 A1 | 6/2005 | Smith et al. |
| 2004/0177036 A1 | 9/2004 | Nutahara et al. | | 2005/0119979 A1 | 6/2005 | Murashita et al. |
| 2004/0181441 A1 | 9/2004 | Fung et al. | | 2005/0125259 A1 | 6/2005 | Annappindi |
| 2004/0186770 A1 | 9/2004 | Pettit et al. | | 2005/0125292 A1 | 6/2005 | Kassab et al. |
| 2004/0186773 A1 | 9/2004 | George et al. | | 2005/0125295 A1 | 6/2005 | Tidwell et al. |
| 2004/0193499 A1 | 9/2004 | Ortiz et al. | | 2005/0125296 A1 | 6/2005 | Tidwell et al. |
| 2004/0193539 A1 | 9/2004 | Sullivan | | 2005/0125315 A1 | 6/2005 | Munoz et al. |
| 2004/0193540 A1 | 9/2004 | Brown et al. | | 2005/0125337 A1 | 6/2005 | Tidwell et al. |
| 2004/0199406 A1 | 10/2004 | Owens et al. | | 2005/0125338 A1 | 6/2005 | Tidwell et al. |
| 2004/0209661 A1 | 10/2004 | Gregorin | | 2005/0125339 A1 | 6/2005 | Tidwell et al. |
| 2004/0210498 A1 | 10/2004 | Freund | | 2005/0125343 A1 | 6/2005 | Mendelovich |
| 2004/0210531 A1 | 10/2004 | Barron et al. | | 2005/0125350 A1 | 6/2005 | Tidwell et al. |
| 2004/0215507 A1 | 10/2004 | Levitt et al. | | 2005/0125351 A1 | 6/2005 | Tidwell et al. |
| 2004/0230482 A1 | 11/2004 | Hendrickson | | 2005/0125360 A1 | 6/2005 | Tidwell et al. |
| 2004/0232223 A1 | 11/2004 | Beenau et al. | | 2005/0131761 A1 | 6/2005 | Trika et al. |
| 2004/0236688 A1 | 11/2004 | Bozeman | | 2005/0131792 A1 | 6/2005 | Rowe |
| 2004/0239481 A1 | 11/2004 | Beenau | | 2005/0137982 A1 | 6/2005 | Michelassi et al. |
| 2004/0242308 A1 | 12/2004 | Gray | | 2005/0144071 A1 | 6/2005 | Monahan et al. |
| 2004/0243468 A1 | 12/2004 | Cohagan et al. | | 2005/0144074 A1 | 6/2005 | Fredregill et al. |
| 2004/0243498 A1 | 12/2004 | Duke | | 2005/0144105 A1 | 6/2005 | Czyzewski |
| 2004/0243506 A1 | 12/2004 | Das | | 2005/0144143 A1 | 6/2005 | Freiberg |
| 2004/0249689 A1 | 12/2004 | Naraki et al. | | 2005/0149386 A1 | 7/2005 | Agura et al. |
| 2004/0249710 A1 | 12/2004 | Smith et al. | | 2005/0149387 A1 | 7/2005 | O'Shea et al. |
| 2004/0249712 A1 | 12/2004 | Brown et al. | | 2005/0149391 A1 | 7/2005 | O'Shea et al. |

| Publication No. | Date | Inventor |
|---|---|---|
| 2005/0149393 A1 | 7/2005 | Leof |
| 2005/0149402 A1 | 7/2005 | Nicholson |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177508 A1 | 8/2005 | Pembroke |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209917 A1 | 9/2005 | Anderson et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0222910 A1 | 10/2005 | Wills |
| 2005/0230473 A1 | 10/2005 | Fajkowski |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289006 A1 | 12/2005 | Cividini et al. |
| 2005/0289044 A1 | 12/2005 | Breslin et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020542 A1 | 1/2006 | Litle |
| 2006/0020558 A1 | 1/2006 | Bonalle et al. |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0036543 A1 | 2/2006 | Blagg et al. |
| 2006/0036553 A1 | 2/2006 | Gupta et al. |
| 2006/0039733 A1 | 2/2006 | Meyerhofer |
| 2006/0041540 A1 | 2/2006 | Shannon et al. |
| 2006/0047573 A1 | 3/2006 | Mitchell et al. |
| 2006/0047589 A1 | 3/2006 | Grau |
| 2006/0053056 A1 | 3/2006 | Alspach-Gross et al. |
| 2006/0053060 A1 | 3/2006 | Wyker |
| 2006/0064329 A1 | 3/2006 | Abolfathi et al. |
| 2006/0074794 A1 | 4/2006 | Nespola, Jr. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0085334 A1 | 4/2006 | Murphy |
| 2006/0095350 A1 | 5/2006 | Hall et al. |
| 2006/0100925 A1 | 5/2006 | Finaly |
| 2006/0100931 A1 | 5/2006 | Deaton et al. |
| 2006/0106696 A1 | 5/2006 | Carlson |
| 2006/0116903 A1 | 6/2006 | Becerra |
| 2006/0116955 A1 | 6/2006 | Strayer et al. |
| 2006/0122918 A1 | 6/2006 | Graboske et al. |
| 2006/0129456 A1 | 6/2006 | Walker et al. |
| 2006/0131869 A1 | 6/2006 | Brignull |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0155569 A1 | 7/2006 | Lord et al. |
| 2006/0157557 A1 | 7/2006 | Lee et al. |
| 2006/0161474 A1 | 7/2006 | Diamond et al. |
| 2006/0161478 A1 | 7/2006 | Turner et al. |
| 2006/0178937 A1 | 8/2006 | Rau et al. |
| 2006/0208060 A1 | 9/2006 | Mendelovich |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259362 A1 | 11/2006 | Cates |
| 2006/0259364 A1 | 11/2006 | Strock et al. |
| 2006/0259390 A1 | 11/2006 | Rosenberger |
| 2006/0261927 A1 | 11/2006 | Kelly et al. |
| 2006/0277103 A1 | 12/2006 | Fujita et al. |
| 2006/0289636 A1 | 12/2006 | Hoblit |
| 2006/0293952 A1 | 12/2006 | Nicholson |
| 2006/0293953 A1 | 12/2006 | Nicholson |
| 2007/0020443 A1 | 1/2007 | Lo |
| 2007/0028144 A1 | 2/2007 | Graham et al. |
| 2007/0034700 A1 | 2/2007 | Poidomani et al. |
| 2007/0038515 A1 | 2/2007 | Postrel |
| 2007/0063025 A1 | 3/2007 | Blossom |
| 2007/0078719 A1 | 4/2007 | Schmitt et al. |
| 2007/0094084 A1 | 4/2007 | Rau et al. |
| 2007/0094154 A1 | 4/2007 | Rau et al. |
| 2007/0124227 A1 | 5/2007 | Dembo |
| 2007/0136211 A1 | 6/2007 | Brown et al. |
| 2007/0156530 A1 | 7/2007 | Schmitt et al. |
| 2007/0168265 A1 | 7/2007 | Rosenberger |
| 2007/0168282 A1 | 7/2007 | Giordano |
| 2007/0203825 A1 | 8/2007 | Hanifin et al. |
| 2007/0208671 A1 | 9/2007 | Brown et al. |
| 2007/0214038 A1 | 9/2007 | Dolph |
| 2007/0214057 A1 | 9/2007 | Lee et al. |
| 2007/0215688 A1 | 9/2007 | Routhenstein |
| 2007/0226097 A1 | 9/2007 | Keechle |
| 2007/0250442 A1 | 10/2007 | Hogan et al. |
| 2007/0265924 A1 | 11/2007 | Schwarz |
| 2008/0005018 A1 | 1/2008 | Powell |
| 2008/0010202 A1 | 1/2008 | Schwarz |
| 2008/0019281 A1 | 1/2008 | Liger et al. |
| 2008/0021841 A1 | 1/2008 | Rau et al. |
| 2008/0027841 A1 | 1/2008 | Eder |
| 2008/0077499 A1 | 3/2008 | Ariff et al. |
| 2008/0109358 A1 | 5/2008 | Kottmeier, Jr. et al. |
| 2008/0126208 A1 | 5/2008 | Nicholson |
| 2008/0133350 A1 | 6/2008 | White et al. |
| 2008/0177659 A1 | 7/2008 | Lacey et al. |
| 2008/0187770 A1 | 8/2008 | Funicelli et al. |
| 2008/0215470 A1 | 9/2008 | Sengupta et al. |
| 2008/0230600 A1 | 9/2008 | Black et al. |
| 2008/0245865 A1 | 10/2008 | Mosteller |
| 2008/0262915 A1 | 10/2008 | Gojkovic et al. |
| 2008/0275779 A1 | 11/2008 | Lakshminarayanan |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0043651 A1 | 2/2009 | Schwarz |
| 2009/0048972 A1 | 2/2009 | Bierer et al. |

| | | | |
|---|---|---|---|
| 2009/0112639 | A1 | 4/2009 | Robinson Beaver |
| 2009/0112658 | A1 | 4/2009 | Mullen et al. |
| 2009/0150370 | A1 | 6/2009 | Christensen et al. |
| 2009/0171778 | A1 | 7/2009 | Powell |
| 2009/0182743 | A1 | 7/2009 | Owens et al. |
| 2009/0222318 | A1 | 9/2009 | Anelevitz et al. |
| 2009/0230195 | A1 | 9/2009 | Lasch et al. |
| 2009/0240620 | A1 | 9/2009 | Kendrick et al. |
| 2009/0242645 | A1 | 10/2009 | Komatsu et al. |
| 2009/0250522 | A1 | 10/2009 | Williams et al. |
| 2009/0261161 | A1 | 10/2009 | Blossom |
| 2009/0265275 | A1 | 10/2009 | Everhart |
| 2009/0271853 | A1 | 10/2009 | Everhart |
| 2009/0313106 | A1 | 12/2009 | Taylor et al. |
| 2009/0313110 | A1 | 12/2009 | Asai et al. |
| 2009/0313131 | A1 | 12/2009 | Giordano |
| 2010/0030675 | A1 | 2/2010 | Hanan et al. |
| 2010/0030697 | A1 | 2/2010 | Goodrich et al. |
| 2010/0057551 | A1 | 3/2010 | Blaisdell |
| 2010/0057553 | A1 | 3/2010 | Ameiss et al. |
| 2010/0088148 | A1 | 4/2010 | Presswala et al. |
| 2010/0114779 | A1 | 5/2010 | Noles |
| 2010/0153199 | A1 | 6/2010 | Ahmad |
| 2010/0283233 | A1 | 11/2010 | Jokinen |
| 2010/0308571 | A1 | 12/2010 | Steenblik et al. |

FOREIGN PATENT DOCUMENTS

| | | |
|---|---|---|
| DE | 19702532 | 3/1998 |
| DE | 102006015818 | 10/2007 |
| EP | 0843292 A2 | 5/1998 |
| EP | 0855659 | 7/1998 |
| EP | 959440 | 11/1999 |
| EP | 0590861 | 1/2001 |
| GB | 2275654 A | 9/1994 |
| GB | 2376787 | 12/2002 |
| GB | 2377071 | 12/2002 |
| GB | 2377314 | 1/2003 |
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 94/29112 | 12/1994 |
| WO | WO 97/20692 | 6/1997 |
| WO | WO 97/41673 | 11/1997 |
| WO | WO 98/10368 | 3/1998 |
| WO | WO 98/59307 | 12/1998 |
| WO | WO 9858345 | 12/1998 |
| WO | WO 99/05633 | 2/1999 |
| WO | WO 99/54841 | 10/1999 |
| WO | WO 01/11532 | 2/2001 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 01/88659 | 11/2001 |
| WO | WO 2005/043277 A3 | 5/2005 |
| WO | WO 2005/101975 | 11/2005 |
| WO | WO 2006/060370 | 6/2006 |
| WO | WO 2006/105092 | 10/2006 |
| WO | WO 2006/116772 | 11/2006 |
| WO | WO 2007/115725 | 10/2007 |
| WO | WO 2008/021381 | 2/2008 |
| WO | WO 2008/021382 | 2/2008 |
| WO | WO 2009/023817 | 2/2009 |

OTHER PUBLICATIONS

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks for ID, TIme Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http://www.firstmonday.org/issues/issue7_3/claessens, retrieved from the internet on Oct. 6, 2006.
Hotchkiss, ATM's at the head of their class, Bank Marketing, vol. 29, No. 3, Mar. 1997, pp. 26-32.
Edwards, ATMs the Hot New Media Buy, ABA Banking Journal, Mar. 1999, pp. 58, 60.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Award Card Comparison, JA7922.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
Card Based Award Systems, JA8309.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.

Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hamey, Kenneth, Home Asset Management Accounts Link Mortgages Equity Lines.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
How Is It Different?, JA8331.
Konrad, IBM Had a Bunch of Unusual Ideas in 2003, www.philly.com, printed Jan. 21, 2004, posted on Jan. 13, 2004, 2 pages.
Incenticard, Bellsouth, JA8329.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Vincent Alonzo, Incentive Marketing . . . Three If by Smart Card, Incentive Sep. 1995, p. 11.
Incentive gift Card: Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251.
Meridian—the leader in card marketing, JA8343.
Meridicard vs. Debit Cards, JA7917.
Clark, Microsoft, Visa to Jointly Develop PC Electronic-Shopping Software, The Wall Street Journal, Nov. 9, 1994, Nov. 9, 1994 WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n2, p1(25), ISSN: 1069-7225, 17 pages.
Lazarony, Stuck for a gift? Give a prepaid credit card, www.bankrate.com, Dec. 21, 1998, 1 page.
Rossman, Kenneth, Summary Appraisal of Real Property.

Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment: Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Wells Fargo Blazes New Trail for Homeowners.
Kenneth Hein, What's the Deal?, Incentive, Jul. 1998, 7 pages.
Machlis et al., Will smart cards replace ATMs?, Computerworld, printed Feb. 23, 2001, 3 pages.
Anonymous, Two Chips Can Be Better Than One, Card Technology, New York, May 2001, (4 pages).
Alaska Housing Finance Corporation, Request for Information Banking Services, Quarterly Unaudited Financial Statements, Mar. 31, 2005 (89 pages) JPMC-ACS-00000143-231.
AmEx-Costco Co-brand Is it a Marketing or Merchant Acceptance Strategy, Card News, vol. 14, Iss. 16, Aug. 25, 1999.
American Banker Inc., NCNB to Become Biggest Bank in Visa Debit Card Program, The American Banker, Mar. 8, 1979.
American Bankers Association, The Bank Credit Card Business, 1996.
None, American Express and Starwood Launch the New Starwood Preferred Guest (SM) Credit Card from American Express, Jun. 19, 2001, PR Newswire, (5 pages).
Anonymous, Association of Inventive Gift Certificate Suppliers, Incentive, vol. 169, No. 8, pp. SS1-SS23, Aug. 1995.
Authorization of Financial Agent and Terms of Performance, Debit Card Application for Houston, Texas, Sep. 1991, acs00277412.
E-Loan, Auto Loan Rates (2001).
Bowen, Welfare Agencies Seek Aid From Smart Cards, Card Technology, Banking Information Source, vol. 7, No. 11, Oct. 2002, p. 74-76.
Board of Governors of the Federal Reserve System—Report to the Congress on the Application of the Electronic Fund Transfer Act to Electronic Stored-Value Products, May 1997, acs00098020.
Business Editors and Real Estate Writers, Business Editors and Real Estate Automotive Writers, Consumers Now Can Know What Loan Rate Offers to Expect Based on Their FICO Credit Score at MyFICO.com, Business Wire, New York, Mar. 6, 2002, p. 1.
Business Editors, Transmedia and United Airlines Partner to Enhance Mileage Plus Dining by iDine, BusinessWire, Jun. 26, 2001.
Business Wire, Inc., Associates-Corp/AMOCO—Announce Plans to Offer Free Visa and MasterCard Accounts, Business Wire, Aug. 29, 1985.
Cheney, et al., How Effective Were the Financial Safety Nets in the Aftermath of Katrina?, Discussion Paper, Payment Cards Center, Federal Reserve Bank of Philadelphia, Jan. 2006.
CardTrak Online, Coca-Cola ATM Money Cards (Apr. 4, 1997) Web page at http://www.cardweb.com/cardtrak/news/cf_4a_97.html printed Apr. 7, 2009 ACS 012.
Citibank EBT Services, Pricing Proposal T-DCS, Best and Final Pricing for Treasury Debit Card Services Pilot—Houston, Texas, Sep. 1991, acs00277456.
Davis, Merchants Unbound, Card Technology, Jun. 2004, vol. 9, No. 7, p. 36 (8 pages).
Debit Card Services—Invitation for Expressions of Interest, EBT, Jul. 1991, acs00277422.
Debit and Stored Value Cards for Government: A Growing Trend but States Could Do More, A Survey and White paper of the EBT Industry Council, Electronic Funds Transfer Association (EFTA), Nov. 2006.
PR Newswire, Delta and American Express Introduce, Always Double Miles Feature on Delta SkyMiles® Cards, Oct. 2, 2000, PR Newswire, p. 1.
Direct Payment Card, International EBT Pilot Evaluation Pilot Evaluation—Argentina, Jan. 1996 acs02055723.
E-Loan, A Better Way to Get a Loan—Frequently Asked Questions (FAQ), Apr. 7, 2001, eloan.com (web.archive.org/web/20010407063242/www.wheels.eloan.com/cgibin/show/autofa...).
E-Loan, A Better Way to Get a Loan, AutoLoan webpage, Apr. 4, 2001, eloan.com (web.archive.org/web20010404223234/www.wheels.eloan.com/cgibin/autoloans?).
Feldman, Judy, Feldman, Pay by Check Over the Phone or Net, Money, vol. 28, Issue 10, p. 178, 2 pages (1999).
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
E-Loan, Frequently Asked Questions (2001).
Ostroff, Jeff, Guide to Buying New Cars, Used Cars, Dealer Scams (2008).
Haddad et al., Congratulations, Grads—You're Bankrupt a Marketing Blitz Buries Kids in Plastic and Debt, BusinessWeek, Issue 3733, p. 48, May 21, 2001 (2 page).
Hamey, Home Asset Management Accounts Link Mortgages Equity Lines [Final Edition], The Washington Post, Oct. 5, 2002.
Hammer, CardFlash, Daily Payment Card News, Jul. 28, 2009, CardWeb.com (3 pages).
Hargreaves et al., The Evaluation of the Expanded EBT Demonstration in Maryland, vol. 1—System Startup, Conversion and Expansion, Final Report, Abt Associates Inc., May 1994, acs00092018.
Hight, Strategies & Tactics Portfolio & Risk Management Consulting Services, www.strategies-tactics.com, retrieved Oct. 15, 2002 (9 pages).

Internet Archives WayBack Machine, American Express, Get it Now and You Could Double Your Frequent Flier Mileage, at http://web.archive.org/web/20010121224500/delta.liveonline.net from Jan. 21, 2001 (retrieved Aug. 13, 2007).

Internet Archives WayBack Machine, Print outs for www.delta.liveonline.net, Jan. 21, 2001.

JPMorgan Chase, In Time of Need: A National Strategy for Disaster Response Cards, Treasury Services—Public Sector, Jan. 26, 2007.

JPMorgan Electronic Financial Services, Response to Request for Information (RRI) submitted to Department of Health and Human Services (HHS), Request for Information for EBT Services, Aug. 10, 2006.

JPMorgan, Abstract, In Time of Need—A National Strategy for Disaster Response Cards, Prepared by the Treasury Services—Public Section Unit of JPMorgan Chase, Jan. 26, 2007.

Kibble-Smith, House Committee on Ways and Means, Statement of Brian Kibble-Smith, JPMorgan Chase Treasury Services, Apr. 5, 2006.

Kiley, Branded!, Catalog Age, Jun. 1996, vol. 3, No. 6, p. 77 (4 pages).

Kilian-Kehr, Mobile Security with Smartcards, Dissertation, Apr. 8, 2002.

Kleege, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).

Lennox, Don't Be Tempted by the Urge to Splurge Zero Rates Sound Great But You'll Pay Dearly in the End, CashPoint, Sunday Mail Newspaper, Glasgow, UK, Jul. 22, 2001 (2 pages).

Lewis, Mortgage Lending Optimized, InternetWeek, Issue 858, Apr. 23, 2001.

LexisNexis Academic, On the Way, vol. 1997, No. 74, p. 2, Mar. 31, 1997.

McMonagle, Chapter VII—Cash Balance Plans in a Traditional Defined Benefit World, as found on google.scholar (dev.soa.org, Jan. 2002), www.soa.org/.../monographs/retirement-systems/cash-balance-symposium/2002/january/m-rs02-3-07.pdf—May 7, 2009.

Modification # 1 to the Authorization of the Financial Agent and Terms of Performance, Sep. 30, 1993, acs00277482.

Modification # 2 to the Authorization of the Financial Agent and Terms of Performance, Mar. 25, 1994, acs00277490.

Modification # 3 to the Authorization of the Financial Agent and Terms of Performance, Feb. 25, 1995, acs00277500.

Modification # 4 to the Authorization of the Financial Agent and Terms of Performance, Apr. 1, 1996, acs00277507.

Nilson, The Nilson Report, Cards v. Paper—Consumer Payment Systems in the U.S., Issue 680, Nov. 1998 (10 pages).

National Automated Clearing House Association (NACHA), Business-to-Business EIPP Presentment Models and Payment Options Part One—Presentment Models, Jan. 2001, Counsel for Electronic Billing and Payment, (cebp.nacha.org).

Ostroff, Guide to Buying New Cars Used Cars Dealer Scams, Feb. 2, 2001, CarBuyingTips.com.

Pae, Boycott Threat Spurs American Express to Rethink Fees, Wall Street Journal, Eastern Ed., New York, Mar. 28, 1991.

Peters et al., Debit Card News—Paperless Trail Leads Debit to a Check-Free Payroll Program, vol. 3, No. 12, Dec. 16, 1997 (3 pages).

Plotnick, Bakersfield Calif Investors Explore Buying Rental Property, Knight Ridder Tribune Business News, Apr. 11, 2004 (4 pages).

Power, Loehmann's Compiles Shopper Data Via Credit Card, vol. 28, No. 3, Jan. 7, 1998 (Dialog Search 01460298).

Pullar-Strecker, 'Kiwi card converts unlikely to lead smart revolution; Little support for changes to risk allocation' (2 Edition) Dominion. Wellington, New Zealand; Apr. 25, 2000, p. IT.6.

Press Release, Mar. 5, 2004, Payment Data Systems Files Patent on Debit Card Payment Solution, American City Business Journals, Inc., Mar. 5, 2004.

Quinn, For Many College Youths, Credit Cards Easy to Get, American Express article; St. Louise Post-Dispatch; Feb. 3, 1989.

Ramsaran, Co-Branded Cards Take Flight, Bank Systems & Technology, May 1, 2005, 52 (1 page).

Roberts, Fnb and Nedcor Launch Into the New Era of Smart Card Banking, Money, Nov. 15, 1998 (3 pages).

Rolfe, Europe's Co-branding Boom, Credit Card Management, Jan. 2003, vol. 15, No. 11, p. 16 (4 pages).

Raine, Visa Putting New Life in Advertising Theme—It's Everywhere You Want to Be Ends After 20 Years, San Francisco Chronicle, Feb. 8, 2006.

Sessums, Unbanked Citizens Draw Government Attention, Federal Reserve Bank of San Francisco, vol. 9, No. 4, (1997) acs00280762.

Sherer, Deals & Deal Makers Web Ventures Seek to Facilitate Business Credit, Private Equity, Wall Street Journal (Eastern edition) New York, Nov. 8, 1999 (3 pages).

Siegel, Accounting Handbook, Second Edition, Barron's Educational Series, Inc., 1995 (7 pages).

Staab, et al., Credit Scoring Models Should be Revised for Internet Card Offers, Card News, Phillips Business Information, vol. 15, Iss 7, Apr. 5, 2000, 4 pages.

The State of Arkansas, Arkansas Code of 1987 Annotated, Title 4—Business and Commercial Law, Documents 3 and 5 1987-1999 (7 pages).

Tah et al., Information Modeling for a Construction Project Risk Management System, Engineering Construction and Architectural Management, 2000, vol. 7, No. 2, pp. 107-119.

None, The Gale Group, Smart Cards Forging Into Credit Card Market, Card News, vol. 10, Iss. 6, Apr. 3, 1995 (Dialog Search 07806544).

The Merchant Glossary, Standard Industry Code-Merchant Category Code (SIC/MCC) definition printed from www.merchantglossary.com/glossary/s/standr-industry-code, Sep. 13, 2009.

Title 26, United States Code, Section 401, as of Aug. 12, 2003, imaged from web.archive.org on Nov. 17, 2008, 4 pages (http://web.archive.org/web/20030812135400/http://www.4.law.cornell.edu/uscode/26/401.

Unknown, Thai Smart Card to Expand Abroad, Cards International, n. 183 p. 5, Sep. 22, 1997, Dialog Search No. 013836879 (www.dialogclassic.com/Mainframe.jsp, p. 1-3).

Wang et al., Flexible Fuzzy OWA Querying Method for Hemodialysis Database, Springer-Verleg, Nov. 5, 2005, pp. 1031-1042 (www.springerlink.com/content/p377pgt724g20028/fulltext.pdf).

Ward, New Debit Card is Introduced to Serve Unbanked Workers, News & Business, Jun. 23, 1999.

Wolf, Personal Finance, Sixth Edition, Chapter 5—The Role of Consumer Credit, Allyn and Bacon, Inc., 1981 (7 pages).

Wood, Corporate Spotlight, Intel—This high-tech company's sales incentive program motivated top performers to become exceptional sales stars, Incentive, Dec. 1997, 4 pages.

Wood, et al., Electronic Transfer of Government Benefits, Federal Reserve Bulletin, vol. 77, No. 4, pp. 203-217, Apr. 1991.

Wenninger et al., The Electronic Purse, Current Issues in Economics and Finance, vol. 1, No. 1, Apr. 1995, acs00098037.

Yee, Using Secure Coprocessors, School of Computer Science Carnegie Mellon University, May 1994.

Youll, Peer to Peer Transactions in Agent Mediated Electronic Commerce, MIT (2001).

\* cited by examiner

US 8,020,754 B2

SYSTEM AND METHOD FOR FUNDING A COLLECTIVE ACCOUNT BY USE OF AN ELECTRONIC TAG

RELATED APPLICATIONS

This is a continuation application of U.S. patent application Ser. No. 11/397,544, filed on Apr. 4, 2006 now U.S. Pat. No. 7,311,244, which is a continuation of U.S. patent application Ser. No. 10/937,655, filed on Sep. 9, 2004 now U.S. Pat. No. 7,051,925, which is a continuation of U.S. patent application Ser. No. 09/927,462, filed on Aug. 13, 2001 and now U.S. Pat. No. 6,945,453. The contents of these applications and patent are herein incorporated by reference.

FIELD OF THE INVENTION

The invention relates generally to the funding of collective accounts through the use of electronic tags ("tag" or "tags"). More specifically, the invention relates to systems and methods for funding a collective account that may be used for a variety of purposes, such as making charitable contributions or otherwise contributing to causes, based on tag usage and the "float" of a prefunded account associated with a tag.

BACKGROUND OF THE INVENTION

Electronic tags are used today to conduct various financial transactions. For instance, the Mobil® division of ExxonMobil Corporation sponsors a program called SPEEDPASS® whereby a customer can purchase gas and other goods and services by activating a system with a tag containing a transponder, where the tag is associated with some source of the customer's funds which are used to pay for the purchase. The tag may be kept on a keyring, and is waved in front of a detector to activate the system.

Another popular, rapidly growing use of electronic tags is in Electronic Toll Collection ("ETC") systems including E-Z PASS,® GEORGIA CRUISE CARD,® SUNPASS,® EPASS,® and FAS-TRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent Transportation Society of America ("ITSA"), a society composed of private and public members which was mandated by the United States Congress in the Intermodal Surface Transportation Efficiency Act of 1991 ("ISTEA") to coordinate the development and deployment of intelligent transportation systems in the United States. ETC systems enhance the safety, capacity, and efficiency of the tollway systems in this country, as well as improve customer service and satisfaction. In addition, ETC systems improve air quality by reducing the number of vehicles which sit at idle speed at tollbooths.

The users of these tags generally associate a prefunded account to serve as a source of funds to pay for charges made with their tags, where the prefunded account balance is referred to as the "float." These prefunded accounts are maintained by the ETC system operator, who invests the account balances and makes a profit off this "float." The user may automatically replenish the prefunded account by instructing the system to charge additional "float" to an individual checking, savings, or credit card account or other source of funds that is associated with the tag when the prefunded account balance reaches a low limit, or the user may manually replenish the prefunded account balance.

ETC systems operate by detecting some tag identification information associated with the tag using some type of sensor as the motorist passes through a tollbooth or otherwise activates the sensor and determining which prefunded account is associated with that tag. Tag identification information may be contained in bar coded labels, which are placed on the vehicle and detected by laser scanners at the tollbooth. Alternatively, tag identification information may be transmitted via an RF or IR or other type of transponder located in the tag, where the emitted signal is read by a reader/antenna located at the tollbooth. Often the tags are intended to be attached to the motorist's front windshield or side window by some type of adhesive, and are, for the most part, contained in generic plastic casings which many consider unattractive to display.

When the tag identification information is detected by a scanner or reader/antenna at a tollbooth, the prefunded account associated with that tag is debited the amount of the corresponding toll or charge. Annual toll revenues for the nation's toll roads which use ETC systems easily exceed one billion dollars a year,[1] so enrollment of users in the nation's ETC systems contemplates a significant "float" potentially to be held by ETC systems operators.

[1] According to data compiled during the years of 1996 through 1999 by the ETTM, a component of the Intelligent Transportation Systems (ITS). See www.ettm.com/usafac.html.

Some potential ETC users currently do not enroll in the systems because they do not want to leave their money in the prefunded account where they lose the use of the account balance, and where they are committed to spending the prefunded account balance with the ETC system operator. Further, as noted, the tags currently used are considered plain and unattractive, which may lead some motorists not to mount the tags on their windshields, creating a safety hazard as those motorists fumble to find the tag to pay the toll.

SUMMARY OF THE INVENTION

The method and system of the invention overcomes these problems of the prior art, and adds an incentive for potential users to sign up for and to use ETC tag systems. As well, the invention provides ETC systems operators an incentive to make charitable and other contributions based on the users' tag usage and "float."

It is feature of the invention to provide a method and system for funding a collective account with a reward based either on aggregate tag usage of a plurality of tags associated with that collective account or on the aggregate of prefunded account balances for a plurality of prefunded accounts associated with the collective account.

It is another feature of the invention to provide an incentive for potential users of electronic tag systems to open and prefund accounts with electronic tag system operators.

It is yet another feature of the invention to facilitate a method for electronic tag systems operators to make charitable and other financial contributions.

It is yet another feature of the invention to provide an electronic tag that will increase public awareness of charitable or other political or educational causes.

It is yet another feature of the invention to facilitate the earning of rewards in a loyalty program sponsored by or otherwise associated with a for-profit or retail program, where the tag is associated with an individual account that is associated with the loyalty program.

It is another feature of the invention to provide an additional benefit to holders of collective accounts by prefunding accounts with individual accounts that are associated with and benefit the holders of the collective accounts through affinity programs.

It is another feature of the invention to encourage use of ETC systems by motorists and thereby benefiting the environment.

It is yet another feature of the invention to increase safety at toll booths by providing an electronic tag that motorists will want to install on their windshields.

One aspect of the invention relates to a method and system for funding a collective account comprising a plurality of tags and prefunded accounts associated with those tags, associating the tags or the "float" of the prefunded accounts to the collective account, aggregating either the tag usage or the prefunded account balance calculating a reward based on the aggregate tag usage or prefunded account balances, and funding the reward to the collective account. The funds in the collective account may be used for a variety of purposes, such as making charitable contributions, funding political campaigns, or making contributions to religious or civic groups or educational institutions.

Another aspect of the invention relates to decorating a tag with a symbol, name, or color scheme of the target organization. Not only does such decoration increase public awareness of the tagholder's chosen cause, but it also increases the likelihood that the user (if a motorist) installs the tag on the windshield of the vehicle which increases highway safety by reducing motorist distraction as he or she fumbles to locate the tag as he or she approaches the toll booth.

Another aspect of the invention relates to a method and system for associating a prefunded account for a tag with an individual account that is itself associated with a loyalty program, and increasing credits in the loyalty program through use of the electronic tag. These loyalty program credits may inure to the benefit of the tagholder, as for example where the individual account amasses cash bonuses or frequent flyer miles upon individual account usage. Alternatively, the loyalty program benefits may inure to a charitable or other organization, as where the individual account is an affinity account that makes a contribution to a chosen card based on individual account usage. Further, an organization that is the beneficiary of both an affinity program associated with an individual account associated with a tag and is also the holder of a collective account associated with the same tag may receive double benefits from tag usage.

As used in this specification, the terms "tag" and "tags" refer to any known or later developed device or object, associated in some manner to a source of funds, that may be used to activate a system for automatically making purchases of goods or services and charge the purchase of those goods or services to the associated source of funds. The associated source of funds may itself be a prefunded account, and may also be associated with at least one other source of funds, as an individual account, to replenish the prefunded account balance.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
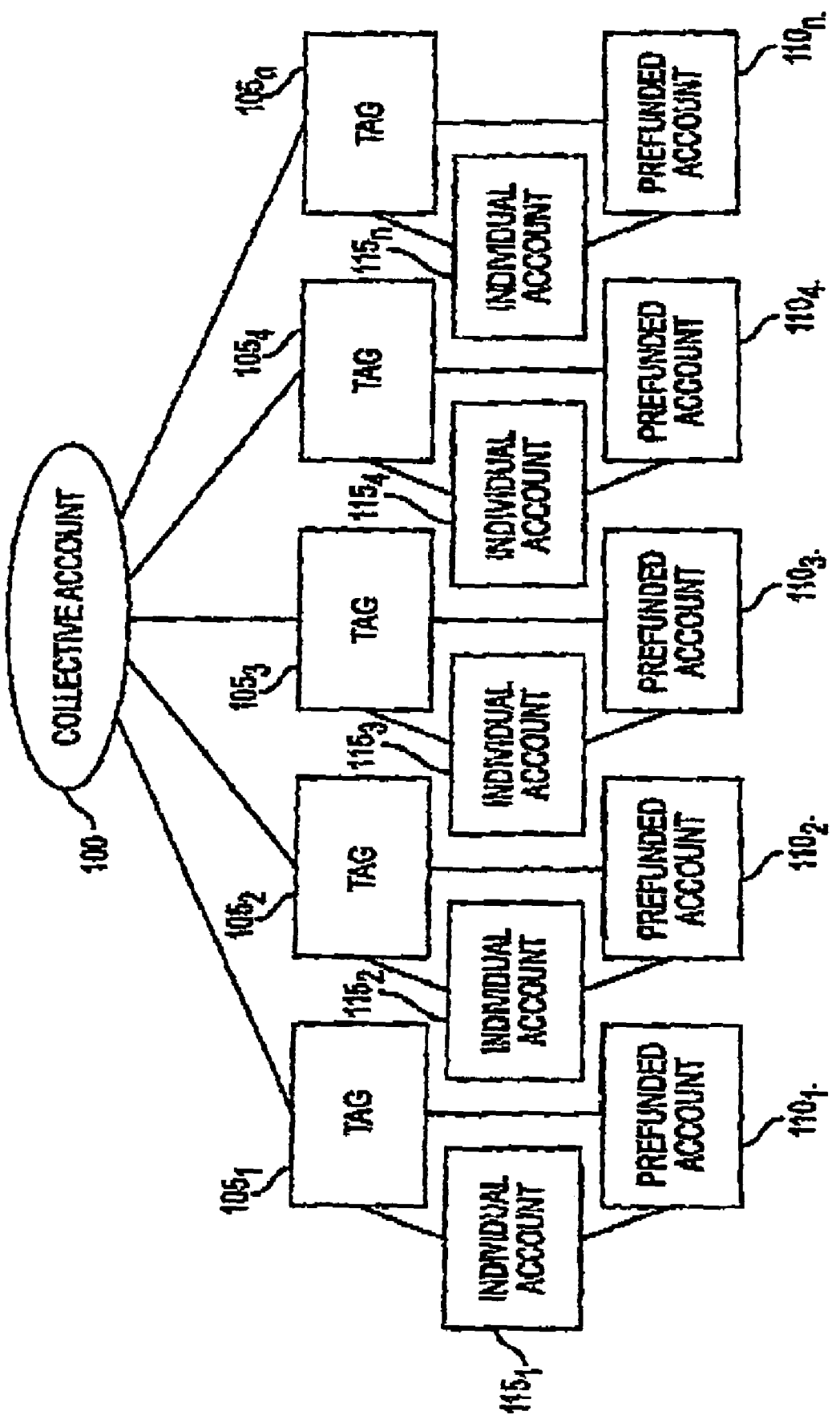
FIG. 1 is a schematic of one embodiment of the invention illustrating a plurality of tags each associated with an individual account, a prefunded account, and a collective account.

The invention relates generally to a method and system for funding a collective account through the use of electronic tags, or through profits made off the "float" of the prefunded accounts associated with those tags. One embodiment of the invention may comprise associating each of a plurality of tags to a prefunded account and a collective account, or alternatively associating the prefunded account directly to the collective account. The invention further comprises aggregating tag usage for all associated tags in the collective account. A reward may be calculated based on the aggregate tag usage for all tags associated with the collective account and the reward credited to the collective account, thus providing an incentive for tagholders to increase their use of ETC systems. The above steps can be accomplished in real time or on a periodic basis. The funds in the collective account may be used for a variety of purposes as, for example, funding of charitable, religious, political, or educational institutions. Individual tagholders may be members of the organization that is the holder of the collective account.

According to another embodiment of the invention, the reward to the collective account may be calculated based on the aggregate prefunded account balances for all prefunded accounts associated with the collective account, thus providing an incentive for tagholders to increase the "float" amounts kept in their prefunded accounts.

In another embodiment of the invention, the system operator may establish a number of collective accounts and designate each collective account for a particular purpose as an environmental purpose, charitable purpose, etc. Tagholders may associate all or a portion of their prefunded accounts and/or tag usage to one or more collective accounts. In this embodiment, it is not necessary that tagholders be members of any organization that is the holder of the collective account, and a single tagholder may associate his or her prefunded account and/or tag usage in percentages to multiple collective accounts.

Tagholders may be issued periodic reporting statements detailing the contributions made in relation to the association of their prefunded accounts and/or tags to collective accounts.

Another embodiment of the invention relates to a computer-based system for funding a collective account, wherein a tag is associated with prefunded and collective accounts. The system may include a host computer capable of programmed response and software capable of monitoring individual tag usage or prefunded account balances, aggregating tag usage or prefunded account balances, and calculating a bonus based on the aggregate tag usage or prefunded account balances of all prefunded accounts associated with a particular collective account. The computer may perform other functions as generating statements of the prefunded accounts to the tagholders and statements of the collective account to the holder of the collective account, and may also be capable of automatically initiating a funds transfer from an individual account associated with the tag and/or prefunded account to replenish the prefunded account based upon predetermined conditions, such as low prefunded account balance. In addition, a plurality of remote computers may be networked or otherwise capable of communicating with the host computer, where the remote computers are associated with reader/antennas at tollbooths or other sites where a tag may be used to purchase a good or service. The reader/antennas may be capable of detecting tag identification information and transmitting the tag identification information along with the charge to the remote computers, which can then transmit the information to the host computer to charge the associated prefunded account for that tag. Alternatively, remote computers may access the host computer for tag identification information, and identify the prefunded account before transmission of the charge information to the host computer.

In another embodiment of the invention, the tag and prefunded account may be associated with an individual account used as a source of funds to replenish the prefunded account based on fulfillment of predetermined conditions, as for example a predetermined low balance amount in the prefunded account. The individual account may be an affinity account, where an organization receives a benefit from use of the individual account. If the affinity organization is also the holder of the collective account, that organization can realize a double benefit from a tagholder's use of the tag—both from the affinity program when the individual account is used to fund the prefunded account, and again when the reward is calculated and awarded based on tag usage. In other embodiments, the individual account may be associated with a loyalty program, where benefits accrue directly to the tagholder upon use of the individual account. In this scenario, increased tag usage benefits the holder of the collective account, and also causes increased needs to replenish the prefunded account, which then benefits the tagholder directly by increased loyalty program credits.

The presence of an LED and/or LCD readout in the tag allows the user to view such information as remaining balance in his or her prefunded account or to receive and/or view messages transmitted from the reader/antenna. The tag may also have the ability to generate a sound that indicates a successful detection by the reader/antenna or a low prefunded account balance which might be a theme song associated with the holder of the collective account, as for example the fight song of a selected university. The tag may have a communication port to allow it to communicate with other devices, as for example relaying traffic information received from the reader/antenna to a device capable of reading and mapping out the relayed information within a vehicle or some remote or hard wired device.

The holder of the collective account can be an organization comprising a plurality of members. However, the tagholders are not necessarily members of the holder of the collective account, as the tagholders may designate different causes to receive the reward. The collective account may also comprise one or more sub-accounts, where each sub-account is designated for a different purpose.

The reward may be calculated in a number of ways. For example, the reward may be based on aggregate tag usage or aggregate "float" of the prefunded account balances associated with the collective account calculated over some period of time. Alternatively, the reward may be customized by basing it on a comparison of aggregate tag usage or aggregate "float" of the refunded account balances during a given period to historic performance, where increased performance in the given period results in a proportionately greater reward. Alternatively, a minimum performance standard may be set to achieve any reward to be credited to the collective account.

Although the invention is described in terms of electronic tags associated with prefunded accounts, collective accounts, and individual accounts, this description is not intended to limit the invention but is rather one embodiment as will be apparent to those skilled in the art.

Referring now to FIG. 1, a schematic of one embodiment of the invention is detailed for funding a collective account 100 such as a charitable contribution account. The invention comprises a plurality of tags $105_1$ through $105_n$, each tag associated with at least one prefunded account $110_1$ through $110_n$. Also, each tag may be associated with a collective account 100, as selected by the tagholder. Alternatively, each prefunded account $110_n$ may be associated directly with the collective account 100, or each tag $105_n$ may be associated with multiple collective accounts (not shown). The invention further comprises aggregating the tag usage for at least some of the tags associated with the collective account 100, calculating a reward based on the aggregate tag usage, and funding the collective account 100 with the calculated reward. Alternatively, for tags associated with multiple collective accounts, the tagholder may select the percentage of tag usage to be associated with each collective account. In other embodiments, account balances of prefunded accounts $110_1$ through $110_n$ may be aggregated for purposes of calculating the reward. The tags and prefunded accounts may also be associated with individual accounts $115_1$ through $115_n$, which may be used as a source of funds to replenish the prefunded accounts $110_1$ through $110_n$ upon fulfillment of a predetermined condition, as a low prefunded account balance.

Figure 2:
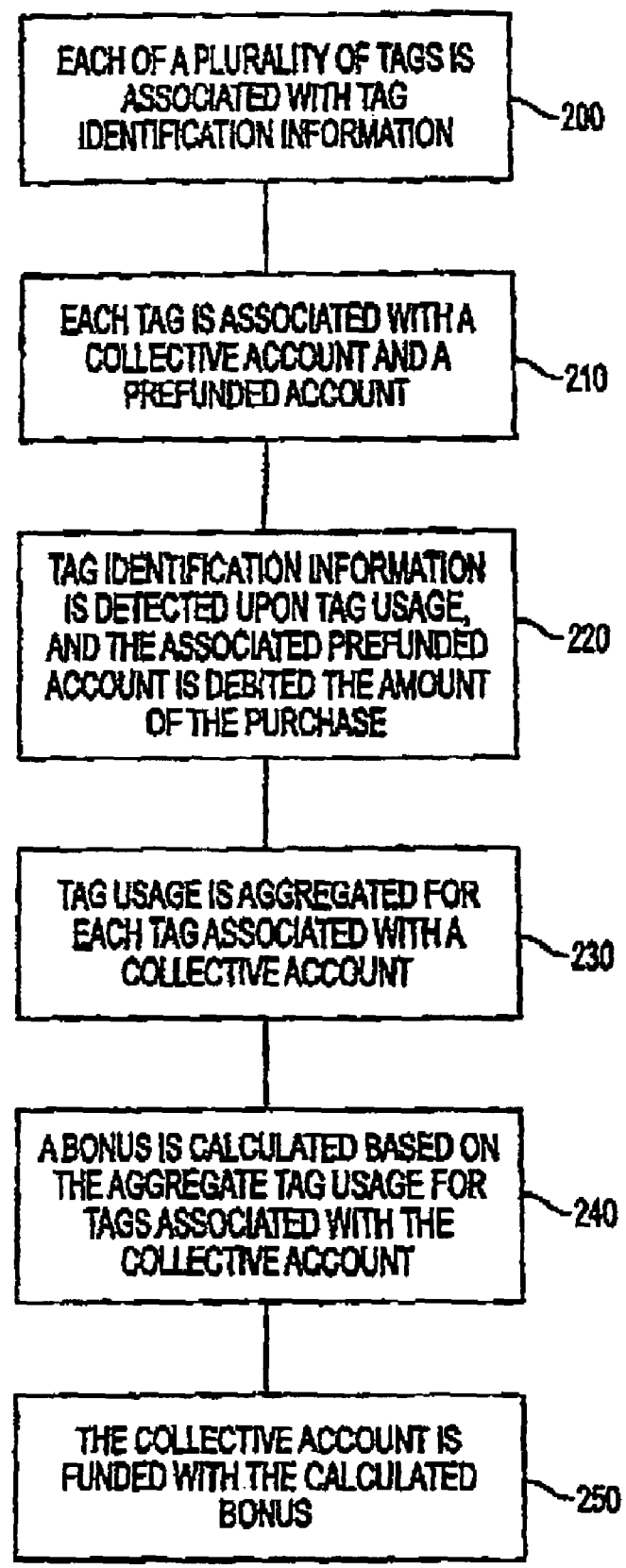
FIG. 2 is a flowscheme of one embodiment of the invention.

A flowscheme of one embodiment of the invention is shown in FIG. 2. At 200, each tag is associated with some tag identification information, which could be detected in various manners as IR or RF transmissions or bar code scanners. At 210, each tag is associated with a prefunded account within the ETC system as well as at least one collective account When the tag identification information is detected by a reader/antenna during tag usage at 220, it is used by the FTC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. Tag usage, or portion of tag usage, can be aggregated for each tag associated with the collective account at 230. At 240, a bonus or reward can be calculated based on aggregate tag usage for a collective account, which is credited to the collective account at 250.

Figure 3:
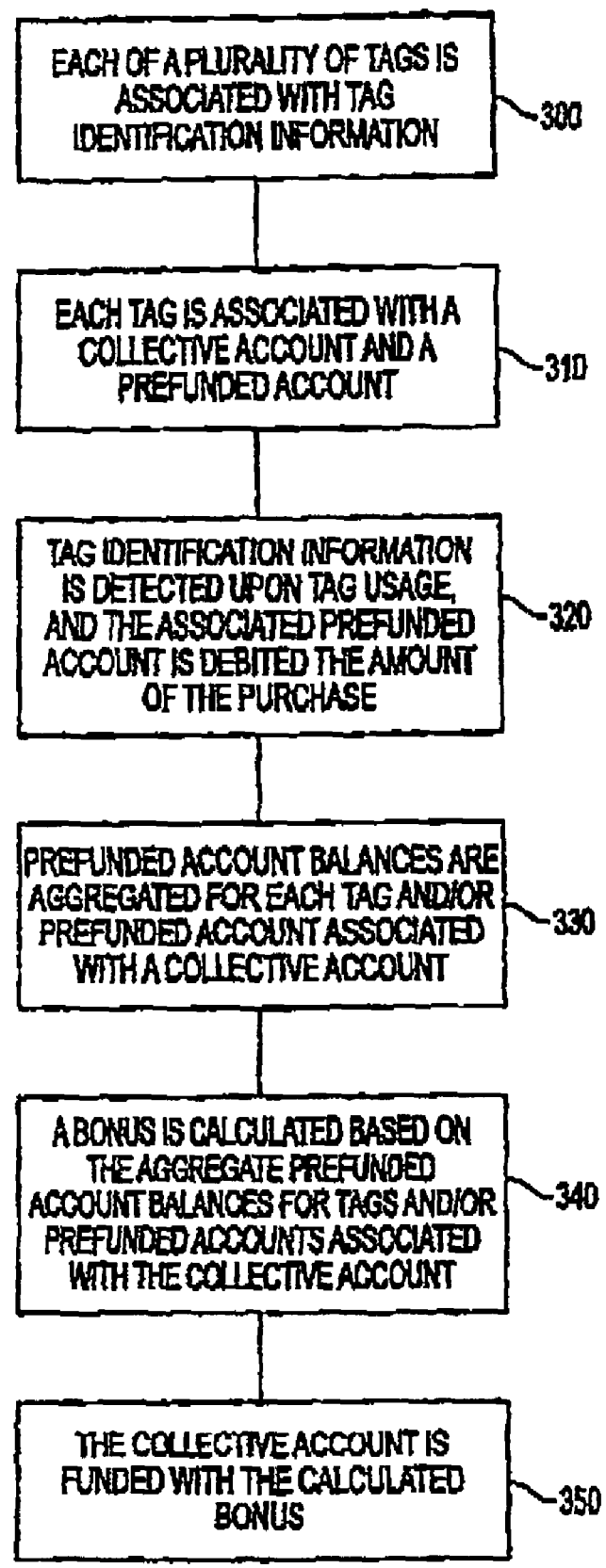
FIG. 3 is a flowscheme of an alternative embodiment of the invention

A flowscheme of an alternative embodiment of the invention is shown in FIG. 3. At 300, each tag is associated with some tag identification information, which could be detected in various manners as IR or RF transmissions or bar code scanners. At 310, each tag is associated with a prefunded account within the ETC system as well as at least one collective account. When the tag identification information is detected by a reader/antenna during tag usage at 320, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection; the ETC system debits the prefunded account associated with the identified tag for the amount of the toll or purchase. On some periodic basis, prefunded account balances can be aggregated for each prefunded account associated directly with, or indirectly through a tag with, the collective account at 330. At 340, a bonus or reward can be calculated based on aggregate prefunded account balances for a collective account, which is credited to the collective account at 350.

Figure 4:
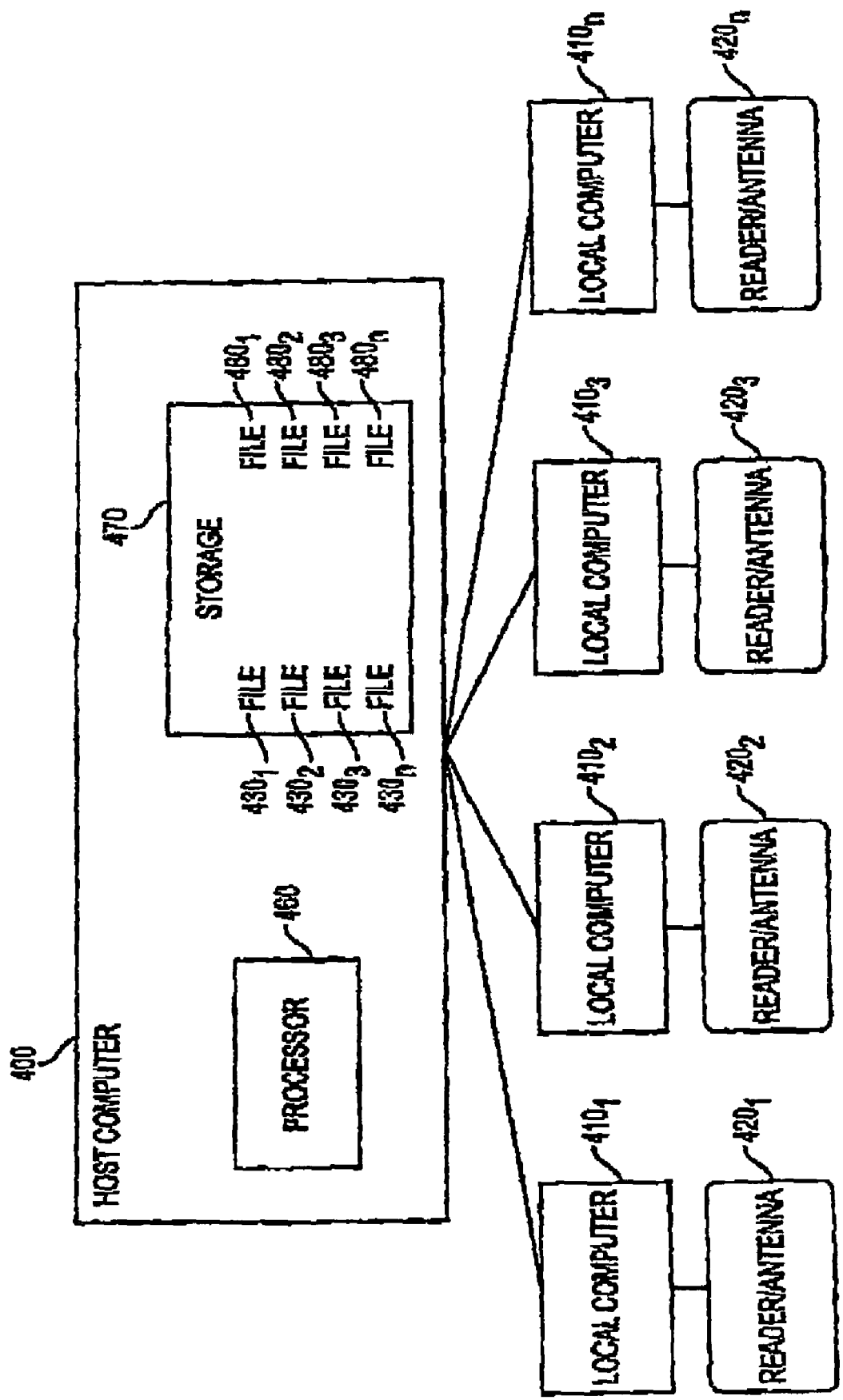
FIG. 4 is a schematic of a computer-based system for funding a collective account.

Referring to FIG. 4, one embodiment of a computer-based system for funding a collective account is described. The ETC system may have a host computer 400, a plurality of remote computers $410_1$ through $410_n$, and a plurality of reader/antennas $420_1$ through $420_n$ associated with remote computers $410_1$ through $410_n$. The host computer has a processor 460 capable of programmed response, and also has a storage unit 470, which may comprise a hard drive or other magnetic, solid state or other storage media, for storing applications, data, operating system and other information.

Upon or anytime after tagholder enrollment with the ETC, searchable indexed computer files $430_1$ through $430_n$ are created by the host computer processor 460 for each enrolled tagholder and stored in the host computer storage 470. The files $430_1$ through $430_n$ may contain such information as an individual tagholder's name, address, tag identification information, prefunded account information, tag usage, and selected collective account(s). The files $430_1$ through $430_n$ may also contain information identifying individual accounts that may be used to replenish the prefunded account balances. Each account can be indexed by the tag identification information, name, and selected collective account. Also, files $484_1$ through $480_n$ may be created by processor 460 and stored in storage 470 containing information for a plurality of collective accounts.

A plurality of readers/antenna $420_1$ through $420_n$ may be located at remote locations from the host computer 400 at the sights where the tagholders use the tags to purchase goods or services. The tag can transmit or is otherwise detectable to provide the tag identification information. Each reader/antenna $420_n$ may be associated with and capable of communicating with a remote computer $410_n$ where each remote computer is capable of communicating with and transmitting information to and receiving information from the host computer 400. In addition, each local computer $410_n$ may also have a processor capable of programmable response and storage capability.

When a tag is detected by the reader/antenna $420_n$ for a purchase of a good or a service, tag identification information can be recorded in the local computer $410_n$ along with the amount of the charge. Either in real time or on a periodic basis, the local computer $410_n$ can communicate with the host computer 400 and transmit the detected tag identification information along with the associated charge amount. Using the tag identification information, the host computer 400 can access the file $430_n$ indexed by that tag identification information, and debit the prefunded account associated with that file for the charge amount.

Either in real time or on a periodic basis, the processor 460 of the host computer 400 can access all tags and/or prefunded accounts that are associated with a certain collective account $480_n$ and either aggregate the total tag usage or the "float" of the prefunded account balances for the prefunded accounts associated with that collective account. A reward can be calculated based on these aggregates, and the processor 460 can initiate a funds transfer in an amount equal to the reward to the collective account $480_n$.

The foregoing embodiments have been presented for the purpose of illustration and description only and are not to be construed as limiting the scope of the invention in any way. The scope of the invention is to be determined from the claims appended hereto.

What is claimed is:

1. A method for automatically reloading a prefunded account associated with an RFID tag, the method comprising:
    associating an RFID tag with a prefunded account, a collective account, a financial institution and at least one organization, wherein a tagholder is a holder of the prefunded account, wherein further the financial institution comprises one or more host computers, wherein further the one or more host computers calculate a reward for the at least one organization based at least in part on RFID tag usage;
    determining that an event related to the RFID tag has occurred, wherein the event includes an activity related to the RFID tag that satisfies a promotional goal;
    incrementing a balance of the collective account by a pre-authorized amount; and
    notifying the holder of the prefunded account that incrementing the balance has occurred.

2. The method of claim 1, wherein the activity related to the RFID tag comprises a plurality of purchases made that are funded using the prefunded account as the source of payment for the purchases, and satisfying the promotional goal comprises a predetermined number of purchases made that use the prefunded account as the source of payment for the plurality of purchases.

3. The method of claim 1, wherein the activity related to the RFID tag comprises a dollar amount of purchases made using the prefunded account, and satisfying the promotion goal comprises the dollar amount or purchases made using the prefunded account comprising a predetermined dollar amount.

4. The method of claim 1, wherein at least one of determining, incrementing or notifying are performed in real-time.

5. The method of claim 1, wherein at least one of determining, incrementing or notifying are performed periodically.

6. The method of claim 1, wherein at least one of determining, incrementing or notifying are performed at a point-of-sale location upon use of the prefunded account.

7. The method of claim 6, wherein determining, incrementing and notifying are performed prior to a next use of the prefunded account.

8. An apparatus to automatically reload a prefunded account associated with an RFID tag, comprising:
    a central processor configured to associate an RFID tag with a prefunded account, a collective account, a financial institution and at least one organization, wherein a tagholder is the holder of the prefunded account, wherein further the financial institution comprises one or more host computers, wherein further the one or more host computers are configured to calculate a reward for the at least one organization based at least in part on RFID tag usage;
    an event processor to determine whether an event related to the RFID tag has occurred, wherein the event includes a threshold activity related to the RFID tag that satisfies a promotional goal; and
    a payment processor to authorize a pre-authorized payment amount triggered by the event and increment an account balance of the collective account by the pre-authorized payment amount.

9. The apparatus of claim 8, wherein the threshold activity comprises a number of purchases made using the prefunded account as the source of payment for the number of purchases.

10. The apparatus of claim 8, wherein the threshold activity comprises a dollar amount of purchases made with the prefunded account as the source of payment for the purchases.

11. A method for reloading a prefunded account associated with an RFID tag, comprising:
   associating an RFID tag with a prefunded account, a collective account, a financial institution and at least one organization, wherein a tagholder is the holder of the prefunded account, wherein further the financial institution comprises one or more host computers, wherein further the one or more host computers calculate a reward for the at least one organization based at least in part on RFID tag usage;
   receiving a request to reward the collective account, the request automatically generated based at least in part on a determination that an event related to the RFID tag has occurred, wherein the event includes an activity related to the RFID tag that satisfies a promotional goal;
   incrementing a balance of the collective account associated with the RFID tag by a pre-authorized amount indicated in the request; and
   confirming whether the request has been completed.

12. The method of claim 11, wherein the request automatically generates after satisfaction of the promotional goal.

13. The method of claim 12, wherein the event comprises a determination that the collective account is eligible for the reward.

14. A computer-accessible medium having executable instructions to reload a prefunded account, the instructions comprising:
   determining that an event related to a RFID tag has occurred, wherein the event includes an activity related to the RFID tag that satisfies a promotional goal;
   incrementing a balance of an account associated with the RFID tag by a pre-authorized amount; and
   notifying a holder of the account associated with the RFID tag of that the balance was incremented,
   wherein the RFID tag is associated with a prefunded account, a collective account, a financial institution and at least one organization, wherein a tagholder is the holder of the prefunded account, wherein further the financial institution comprises one or more host computers, wherein further the one or more host computers calculate a reward for the at least one organization based at least in part on RFID tag usage.

15. The computer-accessible medium of claim 14, wherein the activity associated with using the RFID tag comprises a number of purchases made using the prefunded account as the source of payment for the purchases, and the promotional goal is satisfied when the number of purchases reaches a specified number of purchases, after which the balance of the account is automatically incremented with the pre-authorized amount.

16. The computer-accessible medium of claim 14, wherein the activity associated with using the RFID tag comprises a dollar amount purchased using the prefunded account as the source of payment for the purchases, and the promotional goal is satisfied when the dollar amount reaches a specified dollar amount of purchases, after which the balance of the account is automatically incremented with the pre-authorized amount.

17. The computer-accessible medium of claim 14, wherein at least one of the instructions to determine, to increment and to notify are performed in real-time.

18. The computer-accessible medium of claim 14, wherein at least one of the instructions to determine, to increment and to notify are performed periodically.

19. The computer-accessible medium of claim 14, wherein at least one of the instructions to determine, to increment and to notify are performed at a point of sale location upon use of the prefunded account.

20. The computer-accessible medium of claim 19, wherein at least one of the instructions to determine, to increment and to notify are performed prior to a next use of the prefunded account.

* * * * *